(12) United States Patent
Tayagaki et al.

(10) Patent No.: US 11,746,205 B2
(45) Date of Patent: Sep. 5, 2023

(54) HEAT-EXPANDABLE MICROSPHERES AND APPLICATIONS THEREOF

(71) Applicant: MATSUMOTO YUSHI-SEIYAKU CO., LTD., Yao (JP)

(72) Inventors: Naoya Tayagaki, Yao (JP); Katsushi Miki, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 71 days.

(21) Appl. No.: 16/966,297

(22) PCT Filed: Jan. 16, 2019

(86) PCT No.: PCT/JP2019/001096
§ 371 (c)(1),
(2) Date: Jul. 30, 2020

(87) PCT Pub. No.: WO2019/150951
PCT Pub. Date: Aug. 8, 2019

(65) Prior Publication Data
US 2021/0363320 A1   Nov. 25, 2021

(30) Foreign Application Priority Data

Jan. 31, 2018 (JP) ................................. 2018-014704

(51) Int. Cl.
| C08J 9/20 | (2006.01) |
| C08J 9/232 | (2006.01) |
| C08F 236/12 | (2006.01) |
| C08J 9/224 | (2006.01) |
| B01J 13/14 | (2006.01) |

(52) U.S. Cl.
CPC ............... *C08J 9/20* (2013.01); *B01J 13/14* (2013.01); *C08F 236/12* (2013.01); *C08J 9/224* (2013.01); *C08J 9/232* (2013.01); *C08J 2203/22* (2013.01); *C08J 2309/02* (2013.01)

(58) Field of Classification Search
CPC . B01J 13/14; B01J 13/185; B01J 13/22; C08J 9/20; C08J 9/224; C08J 9/232; C08J 2309/02; C08J 2203/22; C08J 2201/024; C08J 2327/06; C08J 3/12; C08J 9/32; C08J 9/16; C08F 236/12; C09K 3/00
See application file for complete search history.

(56) References Cited

U.S. PATENT DOCUMENTS

| 5,180,752 A * | 1/1993 | Melber ................ B01J 13/206 521/54 |
| 2002/0135084 A1 | 9/2002 | Ohmura et al. |
| 2009/0176098 A1 | 7/2009 | Masuda et al. |
| 2011/0123807 A1 * | 5/2011 | Jun .......................... B01J 13/14 428/407 |
| 2011/0263746 A1 | 10/2011 | Kawaguchi et al. |
| 2013/0030065 A1 | 1/2013 | Masuda et al. |
| 2016/0053100 A1 | 2/2016 | Terasaki et al. |
| 2016/0310924 A1 | 10/2016 | Nakatomi et al. |
| 2018/0208733 A1 | 7/2018 | Tayagaki et al. |

FOREIGN PATENT DOCUMENTS

| CN | 101291958 A | 10/2008 |
| CN | 102070868 A | 5/2011 |
| EP | 2 327 475 A2 | 6/2011 |
| JP | 62-201231 A | 9/1987 |
| JP | 2006-096963 A | 4/2006 |
| JP | 2006-213930 A | 8/2006 |
| JP | 2010-132860 A | 6/2010 |
| JP | 2012-102288 A | 5/2012 |
| JP | 2015-003951 A | 1/2015 |
| WO | 2007/046273 A1 | 4/2007 |
| WO | 2014/157188 A1 | 10/2014 |
| WO | 2017/014064 A1 | 1/2017 |

OTHER PUBLICATIONS

Batra, R.C. Structural foam moulding with microspheres. Popular Plastics & Packaging. Oct. 2009. pp.30-32. (Year: 2009).*
Office Action dated May 4, 2021 from the Swedish Patent and Registration Office in corresponding Swedish Application No. 2051007-9.
International Search Report for PCT/JP2019/001096 dated Apr. 2, 2019 [PCT/ISA/210].
Office Action dated Nov. 2, 2022 from the China National Intellectual Property Administration in Partial corresponding CN Application No. 201980010671.7.

* cited by examiner

*Primary Examiner* — Irina S Zemel

(74) *Attorney, Agent, or Firm* — Sughrue Mion, PLLC

(57) ABSTRACT

Heat-expandable microspheres including a thermoplastic resin shell and a thermally-vaporizable blowing agent encapsulated therein. The thermoplastic resin is a polymer of a polymerizable component containing a cross-linkable monomer (A) which has at least two (meth)acryloyl groups per molecule and a reactive carbon-carbon double bond in addition to the (meth)acryloyl groups and has a molecular weight of at least 500. Also disclosed are hollow resin particles manufactured by expanding the heat-expandable microspheres; fine-particle-coated hollow resin particles including the hollow resin particles; a composition including a base component and the heat-expandable microspheres, or hollow resin particles, or fine-particle coated hollow resin particles; and a formed article manufactured by forming the composition.

20 Claims, 4 Drawing Sheets

HEAT-EXPANDABLE MICROSPHERES AND APPLICATIONS THEREOF

CROSS-REFERENCE TO RELATED APPLICATIONS

This application is a § 371 of International Application No. PCT/JP2019/001096 filed Jan. 16, 2019 which claims priority from Japanese Patent Application No. 2018-014704 filed Jan. 31, 2018.

BACKGROUND OF THE INVENTION

1. Field of the Invention

The present invention relates to heat-expandable microspheres and applications thereof.

2. Description of the Related Art

Heat-expandable microspheres (heat-expandable microcapsules) comprising a thermoplastic resin shell and a blowing agent encapsulated therein can be expanded by heating.

Heat-expandable microspheres are usually used by mixing with a base material and expanded by heating the mixture in order to lighten the base material and impart design potential and cushioning effect to the base material.

Recently, hollow resin particles manufactured by expanding heat-expandable microspheres and having an almost spherical shape have found use as functional additives to a base material.

For example, the recent trend of growing awareness to environmental problems such as global warming and air pollution has increased the demand for reducing the weight of automobiles to improve their fuel efficiency. Thus, automobile manufacturers have sought to reduce the weight of automotive parts and reduce the weight of automotive paints by blending hollow resin particles manufactured by expanding heat-expandable microspheres into organic sol materials used as paints.

Hollow resin particles manufactured by expanding ordinary heat-expandable microspheres, however, can fail to impart the requisite properties to base materials. This is because of their deformation, i.e., rupturing or denting, caused by a high pressure load applied to the hollow resin particles during blending with base materials and processing, specifically, pumping and application of a paint containing hollow resin particles.

Recently, heat-expandable microspheres comprising a polymer shell with a degree of cross-linking of at least 60 wt % composed of a monomer mixture containing at least 95 wt % of (meth)acrylonitrile in which at least 70 wt % of acrylonitrile is contained have been developed. Such heat-expandable microspheres have a shell of highly improved strength and are sufficiently durable against external forces applied to the microspheres in processing.

[PTL 1] Japanese Patent Application Publication 2010-132860

3. Problems Solved by the Invention

Although the heat-expandable microspheres like those disclosed in PTL 1 are durable against external forces in processing before they are expanded, hollow resin particles manufactured by expanding the heat-expandable microspheres have a shell thinner than the shell of unexpanded microspheres and have lower mechanical strength. It has already been found that the shell of such hollow particles is ruptured or dented to deform spherical particles when subjected to a high pressure load, such as a pressure load of 20 MPa or higher applied to the hollow resin particles contained in paints, and the hollow resin particles fail to lighten base materials.

As mentioned above, heat-expandable microspheres processable into hollow resin particles and having a shell that can resist rupturing or denting due to application of a high pressure load have not yet been produced.

It is therefore an object of the present invention to provide heat-expandable microspheres processable into hollow resin particles having a shell that can resist rupturing or denting due to a high pressure load and applications thereof.

Following diligent study, the present inventors found that the above problems can be solved by providing heat-expandable microspheres comprising a thermoplastic resin shell comprising a polymer of a polymerizable component containing a specific cross-linkable monomer to thereby achieve the present invention.

The heat-expandable microspheres of the present invention comprise a thermoplastic resin shell and a thermally-vaporizable blowing agent encapsulated therein, wherein the thermoplastic resin is a polymer of a polymerizable component containing a cross-linkable monomer (A) having at least two (meth)acryloyl groups per molecule and a reactive carbon-carbon double bond in addition to the (meth)acryloyl groups and having a molecular weight of at least 500.

The heat-expandable microspheres of the present invention preferably satisfy at least one of conditions 1) to 4) described below.

1) The cross-linkable monomer (A) is a compound represented by the following formula (1):

$$R^1\text{—}O\text{—}R^2\text{—}O\text{—}R^3 \quad (1)$$

where $R^1$ and $R^3$ are (meth)acryloyl groups and $R^2$ has a structure containing a reactive carbon-carbon double bond and a polymer chain.

2) The polymer chain has a diene as a structural unit.
3) The diene is butadiene and/or isoprene.
4) The polymerizable component contains a nitrile monomer.

The hollow resin particles of the present invention are manufactured by expanding the heat-expandable microspheres described above.

The fine-particle-coated hollow resin particles of the present invention comprise the hollow resin particles described above and a fine particle coating the outer surface of the shell of the hollow resin particles.

The composition of the present invention comprises a base component and at least one selected from the group consisting of the heat-expandable microspheres, hollow resin particles and fine-particle-coated hollow resin particles described above.

The formed article of the present invention is manufactured by forming or molding the above-described composition.

Advantageous Effects of the Invention

The heat-expandable microspheres of the present invention contribute to the manufacture of hollow resin particles having a shell that can resist deformation against a high pressure load.

The hollow resin particles of the present invention manufactured from the heat-expandable particles mentioned above have a shell that can resist deformation against a high pressure load.

The fine-particle-coated hollow resin particles of the present invention manufactured from the heat-expandable particles mentioned above have a shell that can resist deformation against a high pressure load.

The composition of the present invention comprises at least one selected from the group consisting of the heat-expandable microspheres, hollow resin particles and fine-particle-coated hollow resin particles, and which can resist deformation against a high pressure load.

The formed article of the present invention is manufactured by forming or molding the composition and is lightweight.

REFERENCE NUMERALS LIST

Figure 1:
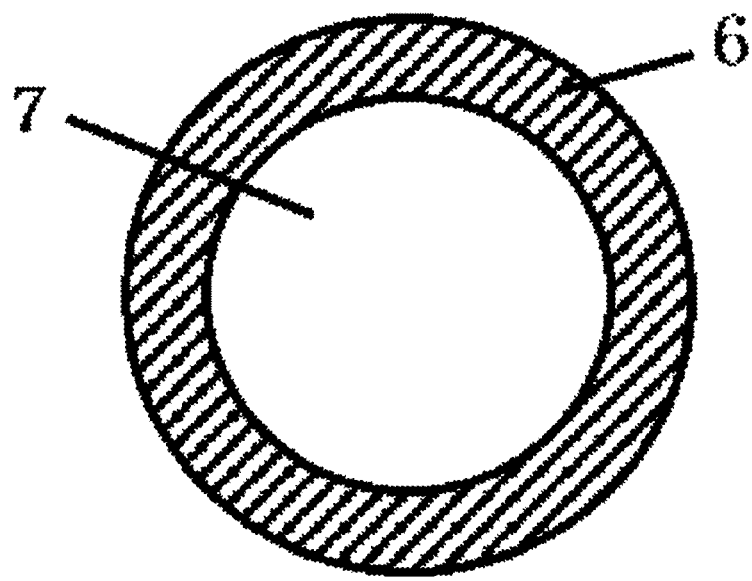
FIG. 1 is a schematic diagram of an example of the heat-expandable microspheres.

Reference numerals used to identify various features in the drawings include the following.
1 Fine-particle-coated hollow resin particles
2 Shell
3 Hollow part
4 Fine particle (in a state of adhesion)
5 Fine particle (in a state of being fixed in a dent)
6 Shell of thermoplastic resin
7 Blowing agent
8 Hot air nozzle
9 Refrigerant flow
10 Overheat prevention jacket
11 Distribution nozzle
12 Collision plate
13 Gas fluid containing heat-expandable microspheres
14 Gas flow
15 Hot airflow

DETAILED DESCRIPTION OF THE PREFERRED EMBODIMENTS

The present invention will next be described in greater detail by reference to the drawings. However, the present invention should not be construed as being limited thereto.

The heat-expandable microspheres of the present invention comprise a thermoplastic resin shell 6 and a core 7 encapsulated therein as shown in FIG. 1. The heat-expandable microspheres have a core-shell structure and the whole of a microsphere is thermally expandable (a microsphere wholly expandable by heating). The thermoplastic resin is a polymer of the polymerizable component.

The polymerizable component is a monomer having at least one polymerizable group per molecule and polymerized into a thermoplastic shell of the heat-expandable microspheres. The polymerizable component includes an uncross-linkable monomer having one reactive carbon-carbon double bond per molecule (hereinafter also referred to as an uncross-linkable monomer) and a cross-linkable monomer having at least two reactive carbon-carbon double bonds per molecule (hereinafter also referred to as a cross-linkable monomer). The cross-linkable monomer introduces cross-linked structure into the resultant polymer. The reactive carbon-carbon double bond mentioned herein is a radically reactive carbon-carbon double bond including carbon-carbon double bonds contained in a vinyl group, (meth)acryloyl group, allyl group and vinylene group, although carbon-carbon double bonds in aromatic rings, such as a benzene ring and naphthalene ring are not included. The (meth)acryloyl group includes acryloyl group and methacryloyl group.

The polymerizable component contains a cross-linkable monomer (A) having at least two (meth)acryloyl groups per molecule and a reactive carbon-carbon double bond in addition to the (meth)acryloyl groups and having a molecular weight of at least 500. The at least two (meth)acryloyl groups in the cross-linkable monomer (A) can be the same or different.

The (meth)acryloyl group has high radical reactivity owing to its structure having a reactive carbon-carbon double bond and polar carbon-oxygen double bond.

The (meth)acryloyl group mainly contributes to the cross-linked structure of the polymer to improve the denseness and rigidity of the shell of heat-expandable microspheres. The resultant polymer has a reactive carbon-carbon double bond per molecule and is considered to have high elasticity owing to its high molecular weight that is achieved by the cross-linkable monomer (A) having a molecular weight of at least 500.

As mentioned above, the thermoplastic resin, which is the polymer of a polymerizable component containing the cross-linkable monomer (A), is rigid and elastic, and the heat-expandable microspheres comprising the thermoplastic resin shell produce hollow resin particles having a very thin shell that can resist deformation against a high pressure load.

The cross-linkable monomer (A) has a molecular weight which is at least 500 and preferably ranges from 500 to 50000. The thermoplastic resin, which is the polymer of the polymerizable component containing the cross-linkable monomer (A) having a molecular weight of at least 500, is rigid and elastic, and the heat-expandable microspheres comprising the thermoplastic shell resin shell produce hollow resin particles having a very thin shell that can resist deformation against a high pressure load.

The upper limit of the molecular weight of the cross-linkable monomer (A) should preferably be 35000, more preferably 25000 and further more preferably 15000. The lower limit of the molecular weight of the cross-linkable monomer (A) should preferably be 600, more preferably 1000 and further more preferably 1500.

The cross-linkable monomer (A) having a molecular weight greater than 50000 can be distributed nonuniformly in the resultant thermoplastic resin shell of heat-expandable microspheres, and the hollow resin particles manufactured from such heat-expandable microspheres may be unable to prevent deformation of their shell against a high pressure load.

On the other hand, the cross-linkable monomer (A) having a molecular weight smaller than 500 fails to impart high elasticity of the resultant thermoplastic resin, and results in hollow resin particles which cannot prevent deformation of their shell against a high pressure load.

The cross-linkable monomer (A) represented by the formula (1) is preferable, because such monomer imparts good rigidity and elasticity to the resultant thermoplastic resin shell of heat-expandable microspheres. Thus, the heat-expandable microspheres produce preferable hollow resin particles having a very thin shell which can resist deformation against a high pressure load.

$$R^1\text{—}O\text{—}R^2\text{—}O\text{—}R^3 \qquad (1)$$

where $R^1$ and $R^3$ are (meth)acryloyl group and $R^2$ has a structure containing a reactive carbon-carbon double bond and a polymer chain.

The $R^2$ group has a structure containing a reactive carbon-carbon double bond and a polymer chain. The reactive carbon-carbon double bond can be contained in the polymer chain or in the structure other than the polymer chain. For attaining the effect of the present invention, the reactive carbon-carbon double bond should preferably be contained in the polymer chain. The polymer chain containing the reactive carbon-carbon double bond is considered to decrease the flexibility of the $R^2$ group to attain better elasticity of the resultant thermoplastic resin shell of heat-expandable microspheres. Such heat-expandable microspheres are considered to produce hollow resin particles having a very thin shell which can resist deformation against a high pressure load.

The $R^2$ group can have a structure composed only of the polymer chain or a structure where a polymer chain and an organic and/or inorganic group other than the polymer chain are bonded.

The organic group is a functional group containing a carbon atom. Such organic group is not specifically restricted and includes alkyl group, alkylene group, alkenyl group, alkynyl group, alkoxy group, oxyalkylene group, carboxyl group, anhydrous carboxyl group, ester group, carbonyl group, amide group, urethane group, phenyl group, phenylene group, (meth)acryloyl group containing a reactive carbon-carbon double bond and allyl group.

One of or at least two of the organic groups can be bonded to the polymer chain.

The inorganic group is a functional group containing no carbon atoms. Such inorganic group is not specifically restricted, and includes hydroxyl group, ether group, amino group, sulfo group, halogen group such as fluoro group and chloro group, and silanol group.

One of or at least two of the inorganic groups can be bonded to the polymer chain like the organic groups.

In addition, the $R^2$ group can have linear or branched structure.

The lower limit of the molecular weight of the $R^2$ group should preferably be 330, more preferably 430, further more preferably 830 and yet further more preferably 1330. On the other hand, the upper limit of the molecular weight should preferably be 49858, more preferably 34860, further more preferably 24860 and yet further more preferably 14860.

If the $R^2$ group has a molecular weight higher than 49858, the cross-linkable monomer (A) can be distributed nonuniformly in the resultant thermoplastic resin shell of heat-expandable microspheres, and the hollow resin particles manufactured from such heat-expandable microspheres can be unable to prevent deformation of their shell against a high pressure load.

On the other hand, if the $R^2$ group has a molecular weight lower than 330, the resultant thermoplastic resin cannot have high elasticity, and the resultant hollow resin particles cannot prevent deformation of their shell against a high pressure load.

The polymer chain should preferably contain a diene as a structural unit. This is because it increases the number of the reactive carbon-carbon double bonds contained in the cross-linkable monomer (A) to improve the elasticity of the resultant thermoplastic resin shell of the heat-expandable microspheres. It also enables the hollow resin particles manufactured from the heat-expandable microspheres to prevent deformation of their very thin shell against a high pressure load.

The diene includes 1,3-butadiene (simply referred to as butadiene herein); 1,3-pentadiene; 1,3-hexadiene; 2,4-hexadiene; 1,3-heptadiene; 1,3-octadiene; isoprene; chloroprene; 2-alkyl-1,3-butadienes, such as 2-methyl-1,3-butadiene, 2-ethyl-1,3-butadiene, 2-propyl-1,3-butadiene, 2-butyl-1,3-butadiene, 2-pentyl-1,3-butadiene, 2-hexyl-1,3-butadien, 2-heptyl-1,3-butadiend, 2-octyl-1,3-butadiene and 2-neopentyl-1,3-butadiene; 2,3-dialkyl-1,3-butadienes, such as 2,3-dimethyl-1,3-butadiene, 2,3-diethyl-1,3-butadiene, 2-methyl-3-ethyl-1,3-butadiene and 2-methyl-3-isopropyl-1,3-butadiene; aryl-1,3-butadiens, such as 1-phenyl-1,3-butadiene and 2-phenyl-1,3-butadiene; conjugated dienes, such as 1-phenyl-2,4-pentadiene, 2-chloro-1,3-butanediene, 2-cyano-1,3-butanediene and 3-methyl-1,3-pentadiene; and unconjugated dienes, such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, 8-methyl-4-ethylidene-1,7-nonadiene, 4-ethylidene-1,7-undecadiene, methyltetrahydroindene, 5-ethylidene-2-norbornene, 5-methylene-2-norbornene, 5-isopropylidene-2-norbornene, 5-vynilidene-2-norbornene, 6-chloromethyl-5-isopropenyl-2-norbornene, 5-vynil-2-norbornene, 5-isopropenyl-2-norbornene, 5-isobutenyl-2-norbornene, cyclopentadiene and norbornadiene.

Of those dienes, butadiene, 1,3-pentadiene, isoprene, chloroprene, 1,3-pentadiene and 1,3-hexadiene are preferable for attaining a better effect of the present invention, and butadiene and isoprene are more preferable.

One of or at least two of the dienes mentioned above can be contained.

The polymer chain containing at least two of the dienes as the structural units can be a random copolymer in which the structural units of the dienes are randomly polymerized, or can be a block copolymer in which the structural units of each diene are grouped and polymerized.

The polymer chain can contain a structural unit other than dienes to the extent that the structural unit does not inhibit the effect of the present invention. Such structural unit other than dienes includes a polyene structural unit in which at least three reactive carbon-to carbon double bonds are contained in a structural unit, such as 1,3,5-hexatriene; a nitrile structural unit, such as acrylonitrile and methacrylonitrile; an aromatic vinyl structural unit, such as styrene, p-methyl styrene, α-methyl styrene, vinylethyl benzene, vinyl xylene, vinyl naphthalene and diphenyl ethylene; and olefin structural unit, such as ethylene, polypropylene and isobutylene.

One of or at least two of the structural units other than dienes can be contained.

The polymer chain containing a structural unit other than dienes can be a random copolymer in which the dienes and structural units other than dienes are randomly polymerized, or can be a block copolymer in which the dienes and structural units other than dienes are respectively grouped and polymerized.

The percentage of the degree of polymerization of the diene structural units in the degree of polymerization of all the structural units constituting the polymer chain is not specifically restricted and should preferably be 1) at least 10%, 2) at least 20%, 3) at least 40%, 4) at least 55%, 5) at least 65%, 6) at least 75%, 7) at least 90% and 8) 100% in this order (where a greater percentage is more preferable).

If the percentage of the degree of polymerization of the diene structural units is lower than 10%, the resultant thermoplastic resin shell of heat-expandable microspheres has low elasticity, and the shell of the hollow resin particles manufactured from the heat-expandable microspheres can deform due to a high pressure load.

The polymer chain containing dienes as structural units can have at least one of a cis structure and a trans structure.

The amount of the cross-linkable monomer (A) should preferably range from 0.1 to 10.0 wt % in 100 wt % of the polymerizable component.

The amount of the cross-linkable monomer (A) within the above range is preferable to attain good rigidity and elasticity of the resultant thermoplastic resin shell of the heat-expandable microspheres. Thus, the hollow resin particles manufactured from the heat-expandable microspheres and comprising a very thin shell can remain almost spherical against a high pressure load without rupture of the shell, or recover their almost spherical shape soon after they are released from a high pressure load to prevent deformation of their shell.

An amount of the cross-linkable monomer (A) lower than 0.1 wt % cannot be effective to attain good rigidity and elasticity of the resultant thermoplastic resin. On the other hand, a percentage of the cross-linkable monomer (A) higher than 10.0 wt % can result in excessively rigid shells of heat-expandable microspheres that cannot produce lightweight hollow resin particles.

The lower limit of the amount of the cross-linkable monomer (A) in the polymerizable component should preferably be 0.2 wt %, more preferably 0.3 wt % and further more preferably 0.4 wt %. The upper limit of the amount of the cross-linkable monomer (A) in the polymerizable component should preferably be 7.0 wt %, more preferably 5.0 wt %, further more preferably 3.0 wt % and most preferably 2.0 wt %.

The polymerizable component can contain a cross-linkable monomer (hereinafter also referred to as other cross-linkable monomers) other than the cross-linkable monomer (A) to the extent that the effect of the present invention is not inhibited.

The "other cross-linkable monomers" include, for example, alkane diol di(meth)acrylates, such as ethylene glycol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentylglycol di(meth)acrylate, 3-methyl-1,5 pentanediol di(meth)acrylate and 2-methyl-1,8 octanediol di(meth)acrylate; polyalkylene glycol di(meth)acrylate, such as diethylene glycol di(meth)acrylate, triethylene glycol di(meth)acrylate, PEG (200) di(meth)acrylate, PEG (400) di(meth)acrylate, PEG (600) di(meth)acrylate, PEG (1000) di(meth)acrylate, dipropylene glycol di(meth)acrylate, tripropylene glycol di(meth)acrylate, polypropylene glycol (400) di(meth)acrylate, polypropylene glycol (700) di(meth)acrylate, polytetramethylene glycol di(meth)acrylate, polytetramethylene glycol (650) di(meth)acrylate and ethoxylated polypropylene glycol (700) di(meth)acrylate; and bifunctional, trifunctional, tetrafunctional or polyfunctional cross-linkable monomers, such as ethoxylated bisphenol A di(meth)acrylate (with 2 to 30 moles of EO), propoxylated bisphenol A di(meth)acrylate, propoxylated ethoxylated bisphenol A di(meth)acrylate, glycerin di(meth)acrylate, 2-hydroxy-3-acryloyloxypropyl methacrylate, dimethylol-tricyclodecane di(meth)acrylate, divinylbenzene, ethoxylated glycerin triacrylate, 1,3,5-tri (meth)acryloylhexahydro-1,3,5-triazine, triaryl isocyanurate, pentaerythritol tri(meth)acrylate, trimethylolpropane tri(meth)acrylate, 1,2,4-trivinyl benzene, ditrimethylolpropane tetra(meth)acrylate, pentaerythritol tetra(meth)acrylate and dipentaerythritol hexa(meth)acrylate. One of or at least two of the "other cross-linkable monomers" can be used in combination.

The amount of the "other cross-linkable monomers" should preferably range from 0.05 to 2.0 wt % in 100 wt % of the polymerizable monomer.

The amount of the "other cross-linkable monomers" within the above range is preferable to attain improved denseness and good rigidity of the resultant thermoplastic resin shell of heat-expandable microspheres.

The amount of the "other cross-linkable monomers" lower than 0.05 wt % cannot be effective to attain good rigidity of the shell of heat-expandable microspheres. On the other hand, an amount of the "other cross-linkable monomers" higher than 2.0 wt % can result in excessively rigid shell of heat-expandable microspheres that cannot produce lightweight hollow resin particles. In addition, a percentage higher than 2.0 wt % can result in a poorly elastic and fragile thermoplastic resin shell of heat-expandable microspheres, and the shell of the hollow resin particles manufactured from such heat-expandable microspheres can deform due to a high pressure load.

The lower limit of the amount of the "other cross-linkable monomers" in the polymerizable component should preferably be 0.1 wt %, more preferably 0.2 wt % and further more preferably 0.3 wt %. The upper limit of the amount of the "other cross-linkable monomers" in the polymerizable component should preferably be 1.5 wt %, more preferably 1.0 wt % and further more preferably 0.8 wt %.

The amount of the cross-linkable monomer (A) in the total of the cross-linkable monomer (A) and the "other cross-linkable monomers" should preferably range from 10 to 100 wt %.

The lower limit of the amount of the cross-linkable monomer (A) in the total of the cross-linkable monomers should preferably be 20 wt %, more preferably 30 wt % and further more preferably 50 wt % and the upper limit should preferably be 99 wt %. The percentage of the cross-linkable monomer (A) in the total of the cross-linkable monomers within the above range is preferable to attain good rigidity and elasticity of the resultant thermoplastic resin shell of heat-expandable microspheres. Thus, the hollow resin particles manufactured from the heat-expandable microspheres and comprising a very thin shell can remain almost spherical against a high pressure load without rupturing the shell or can recover their almost spherical shape soon after they are released from a high pressure load to prevent deformation of their shell.

If the amount of the cross-linkable monomer (A) in the total of the cross-linkable monomers is lower than 10 wt %, the cross-linkable monomers cannot be sufficiently effective to attain good rigidity and elasticity of the resultant thermoplastic resin.

The polymerizable component also contains an uncross-linkable monomer in addition to the cross-linkable monomers.

The uncross-linkable monomer is not specifically restricted, and includes, for example, nitrile monomers such as acrylonitrile, methacrylonitrile, fumaronitrile and maleonitrile; vinyl halide monomers, such as vinyl chloride; vinylidene halide monomers, such as vinylidene chloride; vinyl ester monomers, such as vinyl acetate, vinyl propionate and vinyl butyrate; carboxyl-containing monomers, such as unsaturated monocarboxylic acids including acrylic acid, methacrylic acid, ethacrylic acid, crotonic acid and cinnamic acid, unsaturated dicarboxylic acids including maleic acid, itaconic acid, fumaric acid, citraconic acid and chloromaleic acid, anhydrides of unsaturated dicarboxylic acids, and monoesters of unsaturated dicarboxylic acids including monomethyl maleate, monoethyl maleate, monobutyl maleate, monomethyl fumarate, monoethyl fumarate, monomethyl itaconate, monoethyl itaconate and monobutyl itaconate; (meth)acrylate monomers, such as methyl (meth)acrylate, ethyl (meth)acrylate, n-butyl (meth)acrylate, t-butyl (meth)acrylate, 2-ethylhexyl (meth)acrylate, stearyl (meth)acrylate, phenyl (meth)acrylate, isobornyl (meth)acrylate, cyclohexyl (meth)acrylate, benzyl (meth)acrylate and 2-hydroxyethyl (meth)acrylate; (meth) acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinyl naphthalene salts. A part of or the whole of the carboxyl groups of the carboxyl-containing monomers can be neutralized during or after the polymerization. Acrylic acids and methacrylic acids can be collectively referred to as (meth) acrylic acids. The term "(meth)acrylate" means acrylate or methacrylate, and the term "(meth)acryl" means acryl or methacryl. One of or a combination of at least two of the uncross-linkable monomers can be used.

The uncross-linkable monomer containing a nitrile monomer is preferable for imparting a high gas barrier effect to the resultant thermoplastic resin constituting the shell of heat-expandable microspheres to prevent the encapsulated blowing agent, such as hydrocarbons, from escaping the shell when the blowing agent vaporizes. Thus, the hollow resin particles manufactured from the heat-expandable microspheres are lightweight and their very thin shells can retain a high internal pressure in the cores generated by the vaporized blowing agent to prevent their deformation against a high pressure load.

The amount of the nitrile monomer in the uncross-linkable monomer is not specifically restricted and should preferably range from 30 to 100 wt %.

The lower limit of the amount of the nitrile monomer in the uncross-linkable monomer should preferably be 40 wt %, more preferably 50 wt %, further more preferably 60 wt % and most preferably 70 wt %. On the other hand, the upper limit of the amount of the nitrile monomer in the uncross-linkable monomer should preferably be 98 wt %, more preferably 95 wt % and further more preferably 90 wt %.

The uncross-linkable monomer containing acrylonitrile (hereinafter also referred to as AN) as the nitrile monomer is preferable for improving the gas barrier effect and rigidity of the shell of the resultant heat-expandable microspheres. Thus, the hollow resin particles manufactured from the heat-expandable microspheres have a shell that is not ruptured by a high pressure load and are more durable against deformation. The improved rigidity of the shell makes the hollow resin particles more durable against stress and friction to which the hollow resin particles are subjected when mixed with a base component. The acrylonitrile also improves the solvent resistance of the shell of the resultant heat-expandable microspheres, and the hollow resin particles manufactured from the heat-expandable microspheres can be used with organic solvents with less restriction.

The amount of the acrylonitrile in the uncross-linkable monomer is not specifically restricted and should preferably range from 25 to 100 wt %. The lower limit of the amount of the acrylonitrile in the uncross-linkable monomer should preferably be 40 wt %, more preferably 50 wt %, further more preferably 60 wt % and most preferably 65 wt %. The upper limit of the amount of the acrylonitrile in the uncross-linkable monomer should preferably be 97 wt %.

The nitrile monomer containing acrylonitrile and methacrylonitrile (hereinafter also referred to as MAN) is preferable for improving the denseness of the shell of the resultant heat-expandable particles to prevent the encapsulated blowing agent, such as hydrocarbons, from escaping the shell when the blowing agent vaporizes. Thus, the hollow resin particles manufactured from the heat-expandable microspheres are lightweight, and their very thin shells can retain a high internal pressure in the cores generated by the vaporized blowing agent to prevent their deformation against a higher pressure load.

The weight ratio of the AN and MAN contained in the uncross-linkable monomer is not specifically restricted, and preferably ranges from 20:80 to 100:0 of AN and MAN, more preferably from 35:65 to 95:5 of AN and MAN, further more preferably from 50:50 to 90:10 of AN and MAN, yet further more preferably from 65:35 to 85:15 of AN and MAN, and most preferably from 70:30 to 80:20 of AN and MAN. The weight ratio of AN and MAN within the range contributes to satisfactory denseness of the shell of the heat-expandable microspheres, and the hollow resin particles manufactured from the heat-expandable microspheres are lightweight enough and prevent their shell from deformation due to a high pressure load.

The uncross-linkable monomer containing (meth)acrylate ester contributes to desirable properties of the resultant thermoplastic resin shell of the heat-expandable microspheres. The properties are good stretching of the heated and softened thermoplastic resin and toughness of the resin. The hollow resin particles manufactured from such heat-expandable microspheres are lightweight and can prevent deformation of their shell against a high pressure load.

The amount of the (meth)acrylate ester contained in the uncross-linkable monomer is not specifically restricted and should preferably range from 1 to 50 wt %, more preferably from 3 to 45 wt % and further more preferably from 5 to 40 wt %. The uncross-linkable monomer containing more than 50 wt % of (meth)acrylate ester can result in a poor gas barrier effect of the resultant heat-expandable microspheres, and hollow resin particles manufactured from such heat-expandable microspheres are not lightweight and cannot prevent deformation of their shell against a high pressure load. On the other hand, the uncross-linkable monomer containing less than 1 wt % of (meth)acrylate ester can result in a thermoplastic resin which exhibits poor stretching when heated and softened, and cannot be manufactured into lightweight hollow resin particles.

The amount of the total of the acrylonitrile (AN) and (meth)acrylate ester contained in the uncross-linkable monomer is not specifically restricted, and should preferably range from 40 to 100 wt % of the uncross-linkable monomer.

The amount of the total of the acrylonitrile and (meth)acrylate ester within the above range contributes to desirable properties of the resultant thermoplastic resin shell of the heat-expandable microspheres. The properties are high gas barrier effect, good stretching of the heated and softened thermoplastic resin and toughness of the resin. The hollow resin particles manufactured from such heat-expandable microspheres are lightweight and prevent deformation of their shell against a high pressure load.

The lower limit of the amount of the total of the acrylonitrile and (meth)acrylate ester should preferably be 50 wt %, more preferably 60 wt % and further more preferably 75 wt %, and the upper limit should preferably be 99 wt %. An amount of the total of the acrylonitrile and (meth)acrylate ester less than 40 wt % can result in a poor gas barrier effect of the shell of heat-expandable microspheres, and poor stretching of the heated and softened shell and such heat-expandable microspheres cannot produce lightweight hollow resin particles.

Of those (meth)acrylate esters, methyl methacrylate is preferable for achieving a better effect of the present invention.

The uncross-linkable monomer containing a carboxyl-group-containing monomer is preferable for improved heat-resistance of the resultant heat-expandable microspheres. Of those carboxyl-group-containing monomers, acrylic acid, methacrylic acid, maleic acid, maleic acid anhydride and itaconic acid are preferable, acrylic acid and methacrylic acid are more preferable, and methacrylic acid is most preferable for more improved heat resistance of the resultant heat-expandable microspheres.

The amount of the carboxyl-group-containing monomer in the uncross-linkable monomer is not specifically restricted, and should preferably range from 5 to 70 wt %, more preferably from 10 to 65 wt %, further more preferably from 13 to 60 wt %, yet further more preferably from 15 to 50 wt % and most preferably from 20 to 40 wt %. The percentage of the carboxyl-containing monomer within the above range contributes to improved rigidity of the resultant thermoplastic resin shell of the heat-expandable microspheres, and the hollow resin particles manufactured from the heat-expandable microspheres prevent deformation of their very thin shell against a high pressure load.

An uncross-linkable monomer containing less than 5 wt % of the carboxyl-group-containing monomer results in insufficient heat-resistance of the shell of the resultant heat-expandable microspheres, and the hollow resin particles manufactured from the heat-expandable microspheres can increase their specific gravity during blending the hollow resin particles with a base material or heating the blended material in manufacturing articles. On the other hand, an uncross-linkable monomer containing more than 70 wt % of the carboxyl-group-containing monomer can cause a decreased gas barrier effect of the shell of the resultant heat-expandable microspheres. The resulting heat-expandable microspheres cannot produce lightweight hollow resin particles, and the shell of such hollow resin particles can be fragile and deformed by a high pressure load.

The amount of the total of the nitrile monomer and carboxyl-group-containing monomer in the uncross-linkable monomer is not specifically restricted, and should preferably range from 50 to 100 wt % and more preferably from 60 to 100 wt %.

The amount of the total of the nitrile monomer and carboxyl-group-containing monomer within the above range contributes to high gas barrier effect, satisfactory heat resistance and good rigidity of the shell of the resultant heat-expandable microspheres. The hollow resin particles manufactured from such heat-expandable microspheres are lightweight and highly heat-stable to prevent deformation of their very thin shell against a high pressure load.

The heat-expandable microspheres manufactured from a polymerizable component which includes the uncross-linkable monomer containing a carboxyl-group-containing monomer can be surface-treated with an organic compound containing a metal of Groups 3 to 12 in the Periodic table, or can contain a cross-linkage of carboxyl groups and metal ions in order to improve the rigidity of the shell of the heat-expandable microspheres and enable the shell of the hollow resin particles manufactured from the heat-expandable microspheres to prevent their deformation against high pressure.

The organic compound containing a metal of Groups 3 to 12 in the Periodic table includes a compound containing at least one bond represented by the formula (2) and/or a metal-amino acid compound:

$$M\text{-}O\text{—}C \qquad (2)$$

where M is a metal of the Groups 3 to 12 in the Periodic table; and the carbon atom, C, binds with the oxygen atom, O, and binds only with hydrogen atom and/or carbon atom except oxygen atom.

The metal of Groups 3 to 12 in the Periodic table includes, for example, the Group 3 metals such as scandium, ytterbium and cerium; the Group 4 metals, such as titanium, zirconium and hafnium; the Group 5 metals, such as vanadium, niobium and tantalum; the Group 6 metals, such as chromium, molybdenum and tungsten; the Group 7 metals, such as manganese and rhenium; the Group 8 metals such as iron, ruthenium and osmium; the Group 9 metals, such as cobalt and rhodium; the Group 10 metals, such as nickel and palladium; the Group 11 metals such as cupper, silver and gold; and the Group 12 metals, such as zinc and cadmium. The classification of the metals described above is based on the "Periodic Table of Elements (2005) CD, by Atomic Weight Sub-Committee of The Chemical Society of Japan, 2006", which was bound at the end of "Kagaku-to Kyoiku (Chemistry and Education) vol. 54, No. 4, 2006".

The metal ions constituting the cross-linkage should preferably be a divalent or polyvalent metal cation, such as Al, Ca, Mg, Fe, Ti, Cu and Zn.

The blowing agent vaporizes by heating and the blowing agent encapsulated in the thermoplastic resin shell of heat-expandable microspheres makes the whole of a microsphere thermally expandable (a microsphere wholly expandable by heating).

The blowing agent is not specifically restricted and includes, for example, $C_3$-$C_{13}$ hydrocarbons such as methane, ethane, propane, (iso)butane, (iso)pentane, (iso)hexane, (iso)heptane, (iso)octane, (iso)nonane, (iso)decane, (iso)undecane, (iso)dodecane and (iso)tridecane; hydrocarbons having a carbon number greater than 13 and not greater than 20, such as (iso)hexadecane and (iso)eicosane; hydrocarbons from petroleum fractions such as pseudocumene, petroleum ether, and normal paraffins and isoparaffins having an initial boiling point ranging from 150 to 260° C. and/or being distilled at a temperature ranging from 70 to 360° C.; halides of $C_1$-$C_{12}$ hydrocarbons, such as methyl chloride, methylene chloride, chloroform and carbon tetrachloride; fluorine-containing compounds, such as hydrofluoroether; silanes having $C_1$-$C_5$ alkyl groups, such as tetramethyl silane, trimethylethyl silane, trimethylisopropyl silane and trimethyl-n-propyl silane; and compounds which thermally decompose to generate gases, such as azodicarbonamide, N,N'-dinitrosopentamethylenetetramine and 4,4'-oxybis(benzenesulfonyl hydrazide).

The blowing agent can be composed of one of or a combination of at least two of those compounds. The blowing agent can be any of a linear, branched or alicyclic compound, and should preferably be an aliphatic compound.

The hollow resin particles manufactured by expanding heat-expandable microspheres usually comprise a gaseous blowing agent in their hollow parts, though a part of the blowing agent in the hollow parts can be liquid or solid.

The heat-expandable microspheres should preferably comprise a blowing agent having a vapor pressure higher than 100 kPa at 25° C. which enables the hollow resin particles manufactured by expanding the heat-expandable microspheres to retain high internal pressure of their hollow parts and to prevent deformation of their very thin shells against a high external pressure load.

The blowing agent having a vapor pressure higher than 100 kPa at 25° C. includes, for example, methyl chloride, methane, ethane, propane and (iso)butane, and isobutane is preferable. Isobutane used as the blowing agent contributes to manufacture of lightweight hollow resin particles and retains a high internal pressure of the hollow parts of the hollow resin particles. This is because isobutane is not apt to escape from the shell of the hollow resin particles. Thus, such hollow resin particles have a high repulsion force against a high external pressure load and prevent deformation of their shell.

The blowing agent having a vapor pressure higher than 100 kPa at 25° C. can be composed of one blowing agent or a combination of at least two blowing agents.

The amount of a blowing agent having a vapor pressure higher than 100 kPa at 25° C. in the whole of the blowing agent encapsulated in microspheres should preferably range from 30 to 100 wt % of the whole of the blowing agent. The amount of the blowing agent having a vapor pressure higher than 100 kPa at 25° C. within the above range results in a high internal pressure of the hollow part of the hollow resin particles manufactured from the resultant heat-expandable microspheres, and such hollow resin particles have a high repulsion force against a high external pressure load and prevent deformation of their shell.

The lower limit of the amount of the blowing agent having a vapor pressure higher than 100 kPa at 25° C. contained in the whole of the blowing agent encapsulated in microspheres should preferably be 35 wt % and more preferably 40 wt %, and the upper limit should preferably be 99 wt %.

A blowing agent containing at least one blowing agent having a vapor pressure of 100 kPa or more at 25° C. increases the maximum expansion temperature of the resultant heat-expandable microspheres and properly adjusts the internal pressure of the hollow part of the resultant hollow resin particles.

The encapsulation ratio of the blowing agent in the heat-expandable microspheres is defined as the weight percentage of the blowing agent encapsulated in the heat-expandable microspheres to the weight of the heat-expandable microspheres.

The encapsulation ratio of the blowing agent in heat-expandable microspheres is not specifically restricted and should preferably range from 2 to 35 wt %. An encapsulation ratio within the above range attains a high internal pressure of the heat-expandable microcapsules by heating, and enables manufacture of lightweight hollow resin particles. The encapsulation ratio less than 2 wt % can result in insufficient internal pressure of the heat-expandable microcapsules by heating and lead to failure in manufacturing lightweight hollow resin particles. On the other hand, an encapsulation ratio higher than 35 wt % can result in an excessively thin shell of the resultant heat-expandable microcapsules leading to a poor gas barrier effect of the shell and failure in manufacturing lightweight hollow resin particles.

The lower limit of the encapsulation ratio mentioned above should preferably be 3 wt %, more preferably 4 wt % and further more preferably 5 wt %. The upper limit of the encapsulation ratio mentioned above should preferably be 25 wt %, more preferably 18 wt %, further more preferably 16 wt % and most preferably 14 wt %.

The expansion initiation temperature ($T_s$) of the heat-expandable microspheres is not specifically restricted and should preferably be not lower than 70° C., more preferably not lower than 80° C., further more preferably not lower than 90° C., yet further more preferably not lower than 100° C. and most preferably not lower than 110° C. The upper limit of the expansion initiation temperature of the heat-expandable microspheres should preferably be 250° C., more preferably 220° C., further more preferably 200° C., yet further more preferably 180° C. and most preferably 150° C.

An expansion initiation temperature of the heat-expandable microspheres less than 70° C. or higher than 250° C. cannot attain the effect of the present invention.

The maximum expansion temperature ($T_{max}$) of the heat-expandable microspheres is not specifically restricted, and should preferably be not lower than 90° C., more preferably not lower than 100° C., further more preferably not lower than 110° C., yet further more preferably not lower than 120° C. and most preferably not lower than 130° C. The upper limit of the maximum expansion temperature of the heat-expandable microspheres should preferably be 300° C.

A maximum expansion temperature of the heat-expandable microspheres lower than 90° C. or higher than 300° C. can fail to attain the effect of the present invention.

The expansion initiation temperature ($T_s$) and the maximum expansion temperature ($T_{max}$) of the heat-expandable microspheres are determined by the procedures described in the following Examples.

The volume mean particle size (hereinafter also referred to as mean particle size) (D50) of the heat-expandable microspheres is not specifically restricted and should preferably range from 5 to 80 μm. Heat-expandable microspheres having a volume mean particle size smaller than 5 μm can comprise a thin shell having an insufficient gas barrier effect and cannot produce lightweight hollow resin particles. The heat-expandable microspheres having a volume mean particle size greater than 80 μm can comprise a shell of nonuniform thickness which is apt to leak the blowing agent, and such heat-expandable microsphere cannot produce lightweight hollow resin particles.

The lower limit of the volume mean particle size should preferably be 10 μm and more preferably 15 μm. The upper limit of the volume mean particle size should preferably be 70 μm and more preferably 60 μm.

The volume mean particle size is determined by the procedure described in the following Examples.

The coefficient of variation, CV, of the particle size distribution of the heat-expandable microspheres is not specifically restricted, and should preferably be not greater than 35%, more preferably not greater than 30%, and further more preferably not greater than 25%. The CV can be calculated by the following formulae (1) and (2).

$$CV = (s/<x>) \times 100 \ (\%) \quad (1)$$

$$s = \left\{ \sum_{i=1}^{n} (xi - <x>)^2 / (n-1) \right\}^{1/2} \quad (2)$$

(where s is a standard deviation of the particle size of the microspheres, <x> is a mean particle size of the microspheres, "xi" is the particle size of the i-th microsphere, and "n" represents the number of microspheres).

The maximum expansion ratio of the heat-expandable microspheres is not specifically restricted, and should preferably range from 10 to 200 times. A maximum expansion ratio lower than 10 times is insufficient, and such heat-expandable microspheres cannot produce lightweight hollow resin particles. On the other hand, a maximum expansion ratio higher than 200 times can result in an insufficiently rigid shell of the resultant hollow resin particles, and such hollow resin particles can deform due to a high external pressure load.

The lower limit of the maximum expansion ratio of the heat-expandable microspheres should preferably be 12 times and more preferably 14 times. The upper limit of the maximum expansion ratio of the heat-expandable microspheres should preferably be 180 times and more preferably 150 times.

The maximum expansion ratio of the heat-expandable microspheres is determined by the procedure described in the following Examples.

The heat-expandable microspheres of the present invention have high durability against a high pressure load owing to the rigid and elastic thermoplastic resin constituting the shell of the heat-expandable microspheres. Thus, the heat-expandable microspheres can be preferably applied for the materials processed in molding, such as injection molding, extrusion molding, successively operated kneading and molding, calendaring, blow molding, compaction molding, vacuum molding and thermal molding, and also used by combining with pastes including vinyl chloride pastes and liquid compositions including EVA emulsions, acrylate emulsions and urethane binders.

Process for Producing Heat-Expandable Microspheres

The process for producing heat-expandable microspheres of the present invention includes the step of dispersing an oily mixture which contains a polymerizable component containing the uncross-linkable monomer and the cross-linkable monomer (A), a blowing agent and a polymerization initiator in an aqueous dispersion medium and polymerizing the polymerizable component (hereinafter also referred to as polymerization step).

The polymerization initiator is not specifically restricted, and includes peroxides and azo compounds.

The peroxides include, for example, peroxidicarbonates, such as diisopropyl peroxydicarbonate, di-sec-butyl peroxydicarbonate, di-2-ethylhexyl peroxydicarbonate and dibenzyl peroxydicarbonate; diacyl peroxides, such as lauroyl peroxide and benzoyl peroxide; ketone peroxides, such as methyl ethyl ketone peroxide and cyclohexanone peroxide; peroxy ketals, such as 2,2-bis(t-butylperoxy) butane; hydroperoxides, such as cumene hydroperoxide and t-butyl hydroperoxide; dialkyl peroxides, such as dicumyl peroxide and di-t-butyl peroxide; and peroxyesters, such as t-hexyl peroxypivalate and t-butyl peroxyisobutyrate.

The azo compound includes, for example, 2,2'-azobis(4-methoxy-2,4-dimethyl valeronitrile), 2,2'-azobisisobutylonitrile, 2,2'-azobis(2,4-dimethyl valeronitrile), 2,2'-azobis(2-methyl propionate), 2,2'-azobis(2-methyl butylonitrile) and 1,1'-azobis(cyclohexane-1-carbonitrile).

The amount of the polymerization initiator in the polymerizable component should preferably range from 0.05 to 10 parts by weight to 100 parts by weight of the polymerizable component, more preferably from 0.1 to 8 parts by weight and further more preferably from 0.2 to 5 parts by weight. An amount of the polymerization initiator less than 0.05 parts by weight can leave some of the polymerizable component unpolymerized, and the shell of the resultant heat-expandable microspheres cannot have the requisite rigidity and elasticity. Consequently, the shell of the hollow resin particles manufactured from such heat-expandable microspheres can deform due to high pressure. On the other hand, an amount of the polymerization initiator more than 10 parts by weight can impair the expansion performance of the resultant heat-expandable microspheres and such microspheres cannot produce lightweight hollow resin particles. One of or a combination of at least two of the polymerization initiators can be used.

If the polymerizable component containing a polymerization initiator with a 10-hour half-life temperature higher than the polymerization temperature of the polymerizable component (hereinafter referred to as other polymerization initiators) is used to produce heat-expandable microspheres, the cross-linked structure derived from reactive carbon-carbon double bonds remaining in the shell of the microspheres is formed in the shell of hollow resin particles during heating for manufacturing the hollow resin particles from the heat-expandable microspheres.

The 10-hour half-life temperature of the "other polymerization initiators" should preferably be higher than 90° C. and not higher than 170° C. The "other polymerization initiators" having a 10-hour half-life temperature within the above range do not decompose in the polymerization step for producing heat-expandable microspheres. Also, the initiators decompose in thermal expansion of the heat-expandable microspheres for manufacturing hollow resin particles to generate radicals and form the cross-linked structure derived from reactive carbon-carbon double bonds which functions to prevent deformation of the hollow resin particles against a high external pressure load.

The lower limit of the 10-hour half-life temperature of the "other polymerization initiators" should preferably be 95° C., more preferably 110° C. and further more preferably 130° C. The upper limit of the 10-hour half-life temperature of the "other polymerization initiators" should preferably be 167° C., more preferably 165° C. and further more preferably 163° C.

The "other polymerization initiators" include, for example, peroxides, such as 1,1-di(t-hexylperoxy) cyclohexane, 1,1-di(t-butylperoxy) cyclohexane, 2,2-di(4,4-di-(t-butylperoxy) cyclohexyl) propane, t-hexylperoxyisopropyl monocarbonate, t-butylperoxy-3,5,5-trimethylhexanate, t-butylperoxy laurate, t-hexylperoxy benzonate, dicumyl peroxide and di-t-hexyl peroxide; and azo compounds, such as 2,2'-azobis (N-(2-propenyl)2-methylpropion amide, 1-(1-cyano-1-methylethyl) azoformaide, 2,2'-azobis (N-butyl-2-methylpropion amide), 2,2'-azobis(N-cyclohexyl-2-methylpropion amide) and 2,2'-azobis (2,4,4-trimethyl pentane).

One of or a combination of at least two of the "other polymerization initiators" can be used.

The process for producing the heat-expandable microspheres of the present invention contains the steps of preparing an aqueous suspension by dispersing an oily mixture in an aqueous dispersion medium and polymerizing the polymerizable component.

The aqueous dispersion medium contains water, such as deionized water, as the main component, and the oily mixture is dispersed therein. The aqueous dispersion medium can further contain alcohols, such as methanol, ethanol and propanol, and hydrophilic organic solvents, such as acetone. The hydrophilic property mentioned in the present invention means the property of a substance optionally miscible in water. The amount of the aqueous dispersion medium used in this step is not specifically restricted, and should preferably range from 100 to 1000 parts by weight to 100 parts by weight of the polymerizable component.

The aqueous dispersion medium can further contain an electrolyte, such as sodium chloride, magnesium chloride, calcium chloride, sodium sulfate, magnesium sulfate, ammonium sulfate and sodium hydroxide. One of or a combination of at least two of these electrolytes can be used. The amount of the electrolyte is not specifically restricted, and should preferably range from 0.1 to 50 parts by weight to 100 parts by weight of the aqueous dispersion medium.

The aqueous dispersion medium can contain at least one water-soluble compound selected from among polyalkylene imines having a nitrogen atom bonded with an alkyl group substituted with a hydrophilic functional group selected from carboxylic acid (salt) groups and phosphonic acid (salt) groups, water-soluble 1,1-substitution compounds having a carbon atom bonded with a hetero atom and with a hydrophilic functional group selected from hydroxyl group, carboxylic acid (salt) groups and phosphonic acid (salt) groups, potassium dichromate, alkali metal nitrite salts, metal (III) halides, boric acid, water-soluble ascorbic acids, water-soluble polyphenols, water-soluble vitamin Bs, water-soluble phosphonic acids and phosphonate salts. The term "water-soluble" in the present invention means that at least 1 g of a substance is soluble in 100 g of water.

The amount of the water-soluble compound contained in the aqueous dispersion medium is not specifically restricted, and should preferably range from 0.0001 to 1.0 part by weight to 100 parts by weight of the polymerizable component, more preferably from 0.0003 to 0.1 parts by weight, and most preferably from 0.001 to 0.05 parts by weight.

The aqueous dispersion medium can contain a dispersion stabilizer or dispersion stabilizing auxiliary in addition to the electrolytes and water-soluble compounds.

The dispersion stabilizer is not specifically restricted, and includes, for example, calcium triphosphate, magnesium pyrophosphate and calcium pyrophosphate produced by double reaction, colloidal silica, alumina sol and magnesium hydroxide. One of or a combination of at least two of those dispersion stabilizers can be used.

The amount of the dispersion stabilizer should preferably range from 0.05 to 100 parts by weight to 100 parts by weight of the polymerizable component and more preferably from 0.2 to 70 parts by weight.

The dispersion stabilizing auxiliary is not specifically restricted, and includes, for example, polymeric dispersion stabilizing auxiliaries, and surfactants, such as cationic surfactants, anionic surfactants, amphoteric surfactants and nonionic surfactants. One of or a combination of at least two of the dispersion stabilizing auxiliaries can be used.

The aqueous dispersion medium is prepared, for example, by optionally selecting and blending electrolytes, water-soluble compounds, dispersion stabilizers and dispersion stabilizing auxiliaries with water (deionized water). The pH of the aqueous dispersion medium for polymerization is adjusted according to the water-soluble compounds, dispersion stabilizers and dispersion stabilizing auxiliaries.

The polymerization can be conducted in the presence of sodium hydroxide or the combination of sodium hydroxide and zinc chloride.

In the polymerization step, the oily mixture is dispersed and suspended in the aqueous dispersion medium to be formed into oil globules of a prescribed particle size.

The methods for dispersing and suspending the oily mixture include generally known dispersion methods, such as agitation with a Homo-mixer (for example, a device manufactured by Primix Corporation), dispersion with a static dispersing apparatus such as a Static mixer (for example, a device manufactured by Noritake Engineering Co., Ltd.), membrane emulsification technique and ultrasonic dispersion.

Then suspension polymerization is started by heating the dispersion in which the oily mixture is dispersed into oil globules in the aqueous dispersion medium. During the polymerization reaction, the dispersion should preferably be agitated gently to prevent floating of monomers and sedimentation of polymerized heat-expandable microspheres.

The polymerization temperature can be settled optionally depending on the type of the polymerization initiator, and should preferably be controlled within the range from 30 to 90° C. and more preferably from 40 to 88° C. The polymerization temperature should preferably be maintained for about 1 to 20 hours. The initial pressure for the polymerization is not specifically restricted, and should preferably be controlled within the range of from 0 to 5 MPa in gauge pressure, and more preferably from 0.2 to 3 MPa.

The resultant slurry is filtered with a centrifugal separator, press filter or suction extractor to be processed into a cake with a water content ranging from 10 to 50 wt %, preferably from 15 to 45 wt % and more preferably from 20 to 40 wt %. The cake is dried in a tray drier, indirect heating oven, fluidized bed dryer, vacuum dryer, vibration dryer or flash dryer to be prepared into dry powder with a moisture content not greater than 5 wt %, preferably not greater than 3 wt % and more preferably not greater than 1 wt %.

The cake can be washed with water and/or redispersed in water and then filtered again before the drying step for the purpose of decreasing the content of the ionic substances. The slurry can also be dried with a spray dryer or fluidized bed dryer to be processed into dry powder.

Hollow Resin Particles

The hollow resin particles of the present invention are manufactured by thermally expanding the heat-expandable microspheres produced in the process mentioned above. The hollow resin particles are lightweight and exhibit excellent material properties when contained in a composition or formed article.

The hollow resin particles of the present invention are manufactured by thermally expanding the heat-expandable microspheres produced in the process mentioned above. The hollow resin particles comprise a shell composed of a thermoplastic resin manufactured by polymerizing a specific polymerizable component and that is able to prevent deformation against high pressure.

The hollow resin particles of the present invention are manufactured from the heat-expandable microspheres produced in the process mentioned above by thermally expanding the microspheres at a temperature preferably ranging from 70 to 450° C. The thermal expansion process is not specifically restricted, and either dry thermal expansion or wet thermal expansion can be employed.

An example of dry thermal expansion is the method disclosed in Japanese Patent Application Publication 2006-213930, specifically, the internal injection method. Another example of dry thermal expansion is the method disclosed in Japanese Patent Application Publication 2006-96963. An example of wet thermal expansion is the method disclosed in Japanese Patent Application Publication 1987-201231.

The hollow resin particles usually comprise a gaseous blowing agent in their hollow cores as mentioned above, although part of the blowing agent in the hollow parts can be liquid or solid. The hollow parts can also contain the air taken from the external environment.

A blowing agent contained in the hollow part of the hollow resin particles keeps high internal pressure of the part to provide a high repulsion force that supports the inside of the shell of the hollow resin particles when the particles are subjected to a high external pressure load and prevents deformation of the shell.

The encapsulation ratio of the blowing agent contained in the hollow part of the hollow resin particles means the ratio by weight of the blowing agent to the hollow resin particles. Specifically, the encapsulation ratio is defined as that determined in the procedure described in the Examples. The encapsulation ratio of the blowing agent is not specifically restricted, and should preferably range from 2 to 35 wt %. The encapsulation ratio of the blowing agent contained in the hollow part of the hollow resin particles within the above range enables the hollow resin particles to retain a high internal pressure of their hollow part and satisfactory thickness of the shell. Thus, the hollow resin particles can prevent deformation against high external pressure.

If the encapsulation ratio of the blowing agent contained in the hollow part of the hollow resin particles is lower than 2 wt %, the internal pressure by the blowing agent in the hollow part is insufficient and the shell of the hollow resin particles can deform due to high external pressure load. On the other hand, if the encapsulation ratio of the blowing agent contained in the hollow part of the hollow resin particles is higher than 35 wt %, the resultant hollow resin particles comprise an excessively thin shell which can deform due to a high external pressure load. The lower limit of the encapsulation ratio of the blowing agent contained in the hollow part of the hollow resin particles should preferably be 4 wt % and more preferably 5 wt %. On the other hand, the upper limit of the encapsulation ratio should preferably be 28 wt %, more preferably 23 wt %, further more preferably 18 wt % and most preferably 17 wt %.

The mean particle size of the hollow resin particles can be optionally designed according to their application and is not specifically restricted, although the mean particle size should preferably range from 10 to 300 µm for preventing deformation of the shell of the hollow resin particles. The hollow resin particles having a mean particle size smaller than 10 µm can have an insufficiently thick shell which can deform due to high external pressure. The hollow resin particles having a mean particle size larger than 300 µm can have a shell with nonuniform thickness which causes the escape of the blowing agent and deforms due to high external pressure load.

The lower limit of the mean particle size of the hollow resin particles should preferably be 30 µm and more preferably 40 µm, and the upper limit of the mean particle size should preferably be 250 µm and more preferably 200 µm.

The mean particle size is determined by the procedure described in the Examples.

The coefficient of variation of the particle size distribution of the hollow resin particles is not specifically restricted, and should preferably be not greater than 35%, more preferably not greater than 30%, and most preferably not greater than 25%.

The true specific gravity of the hollow resin particles is not specifically restricted, and should preferably range from 0.005 to 0.6, more preferably from 0.015 to 0.4 and further more preferably from 0.020 to 0.3. Hollow resin particles having a true specific gravity lower than 0.05 comprise a thin shell which can deform due to a high external pressure load. On the other hand, hollow resin particles having a true specific gravity higher than 0.6 have a poor effect of decreasing the specific gravity of the materials containing the particles. Thus, a high amount of such hollow resin particles is required to prepare a composition for lightweight articles, and such a high amount can impair the properties of the composition and resultant formed articles.

Figure 2:
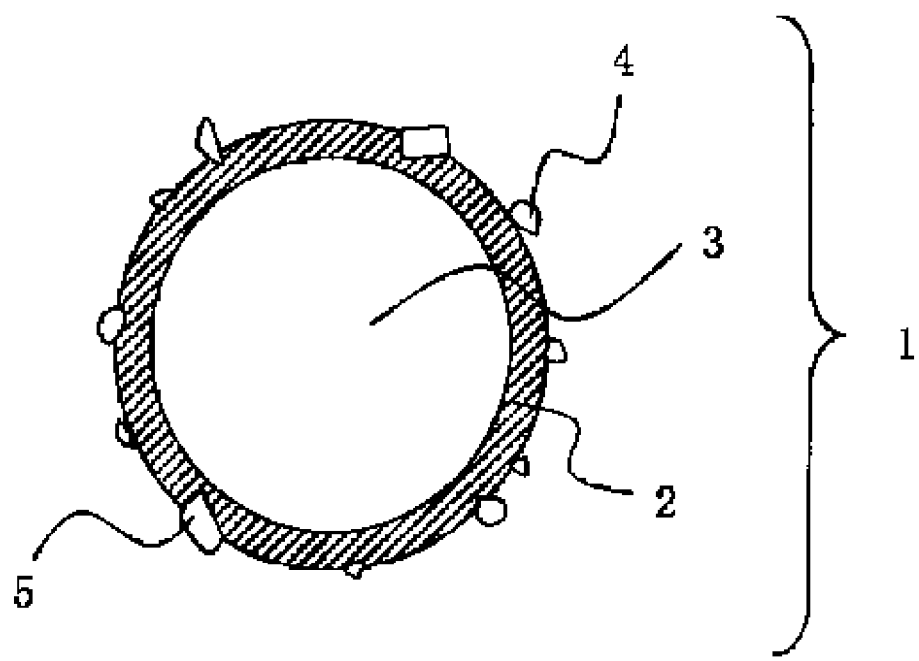
FIG. 2 is a schematic diagram of an example of the fine-particle-coated hollow resin particles.

As shown in FIG. 2, the hollow resin particles (1) can comprise the fine particles (4 and 5) coating the outer surface of the shell (2) of the particles, and such particles are also referred to as fine-particle-coated hollow resin particles.

The coating mentioned herein means that the fine particles (4 and 5) are in a state of adhesion (the state of the fine particle 4 in FIG. 2) on the outer surface of the shell 2 of the fine-particle-coated hollow resin particles, or in a state of fixation (the state of the fine particle 5 in FIG. 2) in a dent on the outer surface of the shell as the result of the fine particle filler embedding into the thermoplastic shell softened or melted by heating. The shape of the fine particles can be irregular or spherical.

The fine particles coating the hollow resin particles prevents scattering of the hollow resin particles to improve their handling property and improves their dispersibility in a base component, such as binders and resins.

The fine particles can be selected from various materials including both inorganic and organic materials. The shape of the fine particles includes spherical, needle-like and plate-like shapes.

The inorganic compounds for the fine particles are not specifically restricted, and include, for example, wollastonite, sericite, kaolin, mica, clay, talc, bentonite, aluminum silicate, pyrophyllite, montmorillonite, calcium silicate, calcium carbonate, magnesium carbonate, dolomite, calcium sulfate, barium sulfate, glass flake, boron nitride, silicon carbide, silica, alumina, isinglass, titanium dioxide, zinc oxide, magnesium oxide, zinc oxide, hydrotalcite, carbon black, molybdenum disulfide, tungsten disulfide, ceramic beads, glass beads, crystal beads and glass microballoons.

The organic compounds for the fine particles are not specifically restricted, and include, for example, sodium carboxymethyl cellulose, hydroxyethyl cellulose, methyl cellulose, ethyl cellulose, nitro cellulose, hydroxypropyl cellulose, sodium alginate, polyvinyl alcohol, polyvinyl pyrolidone, sodium polyacrylate, carboxyvinyl polymer, polyvinyl methyl ether, magnesium stearate, calcium stearate, zinc stearate, polyethylene wax, lauric amide, myristic amide, palmitic amide, stearic amide, hydrogenated castor oil, (meth)acrylic resin, polyamide resin, silicone resin, urethane resin, polyethylene resin, polypropylene resin and fluorine resin.

The inorganic and organic compounds for the fine particles can be surface-treated with a surface-treatment agent, such as a silane coupling agent, paraffin wax, fatty acid, resin acid, urethane compound and fatty acid ester, or cannot be surface-treated.

The mean particle size of the fine particles should preferably range from 0.001 to 30 µm, more preferably from 0.005 to 25 µm, and most preferably from 0.01 to 20 µm. The mean particle size of the fine particles mentioned herein is determined by laser diffractometry.

The ratio of the mean particle size of the fine particles to the mean particle size of the hollow resin particles (the mean particle size of the fine particles/the mean particle size of the hollow resin particles) should preferably be not higher than 1 for sufficiently coating the particles with the fine particles, more preferably not higher than 0.1 and further more preferably not higher than 0.05.

The amount of the fine particles in the fine-particle-coated hollow resin particles is not specifically restricted, and should preferably be lower than 95 wt %, more preferably lower than 90 wt %, further more preferably lower than 85 wt % and most preferably lower than 80 wt %. The amount of the fine particles not lower than 95 wt % can result in a higher amount of the fine-particle-coated hollow resin particles required to be added to a composition and lead to increased cost of the fine-particle-coated hollow resin particles. The lower limit of the amount of the fine particles should preferably be 20 wt % and more preferably 40 wt %.

The true specific gravity of the fine-particle-coated hollow resin particles is not specifically restricted, and should preferably range from 0.06 to 0.60. The fine-particle-coated hollow resin particles having a true specific gravity lower than 0.06 can have a thin shell which can deform due to a high external pressure load. On the other hand, the fine-particle-coated hollow resin particles having a true specific gravity higher than 0.60 have a poor effect of decreasing the specific gravity of the materials containing the particles. Thus, a high amount of such hollow resin particles is required to prepare a composition for lightweight articles, and such a high amount can impair the properties of the composition and resultant formed articles.

The lower limit of the true specific gravity of the fine-particle-coated hollow resin particles should preferably be 0.10 and more preferably 0.12, and the upper limit of the true specific gravity should preferably be 0.30 and more preferably 0.20.

The hollow resin particles and fine-particle-coated hollow resin particles can have further expansion performance. The further expansion performance means the property of the hollow resin particles and fine-particle-coated hollow resin particles to further expand (re-expand) by heating.

The further expansion ratio of the hollow resin particles and fine-particle-coated hollow resin particles is not specifically restricted, and should preferably range from 5 to 85%. Hollow resin particles or fine-particle-coated hollow resin particles having a further expansion ratio lower than 5% can have a poor performance of retaining the blowing agent or fail to retain a required amount of the blowing agent encapsulated in their shell and thus their shell can deform due to a high external pressure load. On the other hand, hollow resin particles or fine-particle-coated hollow resin particles having a further expansion ratio of higher than 85% indicates that the particles can fail to attain satisfactory lightweight effect.

The lower limit of the further expansion ratio of the hollow resin particles and fine-particle-coated hollow resin particles should preferably be 10% and more preferably 15%, and the upper limit of the further expansion ratio should preferably be 80% and more preferably 70%.

The further expansion ratio of the hollow resin particles and fine-particle-coated hollow resin particles represents the degree of their re-expansion compared to the expansion of the hollow resin particles manufactured by maximally expanding heat-expandable microspheres (hereinafter also referred to as maximally expanded hollow resin particles).

The further expansion ratio is calculated by the following formulae from the true specific gravity of the hollow resin particles ($d_2$), the true specific gravity of the hollow resin particles comprised in the fine-particle-coated hollow resin particles ($d_4$) and the true specific gravity of the maximally expanded hollow resin particles ($d_5$).

Further expansion ratio of hollow resin particles (%)=(1−$d_5/d_2$)×100

Further expansion ratio of fine-particle-coated hollow resin particles (%)=(1−$d_5/d_4$)×100

The true specific gravity of the hollow resin particles ($d_2$), the true specific gravity of the hollow resin particles comprised in the fine-particle-coated hollow resin particles ($d_4$) and the true specific gravity of the maximally expanded hollow resin particles ($d_5$) are determined by the procedure given in the Examples.

The fine-particle-coated hollow resin particles are blended in the composition described below to be prepared into a useful paint composition or adhesive composition.

The fine-particle-coated hollow resin particles are prepared, for example, by thermally expanding fine-particle-coated heat-expandable microspheres. The preferable process for manufacturing the fine-particle-coated hollow resin particles include a step of mixing heat-expandable microspheres and a fine particle (mixing step) and a step of heating the mixture from the mixing step at a temperature higher than the softening temperature mentioned above to expand the heat-expandable microspheres and coat the outer surface of the resultant hollow resin particles with the fine particles (coating step).

The heat-expandable microspheres and fine particles are mixed in the mixing step. The heat-expandable microspheres and fine particles are those mentioned above.

The amount of the fine particles in the total of the heat-expandable microspheres and the fine particles is not specifically restricted, and should preferably be lower than 95 wt %, more preferably lower than 90 wt %, further more preferably lower than 85 wt % and most preferably lower than 80 wt %. The amount of the fine particles higher than 95 wt % can cause an excessively high true specific gravity of the resultant fine-particle-coated hollow resin particles to impair the lightweight effect of the particles.

The device used to mix the heat-expandable microspheres and fine particles in the mixing step is not specifically restricted, and a quite simple device, such as a combination of a vessel and stirring paddle, can be used. A common type of powder mixer which shakes and agitates powder materials can be used. Such powder mixers include a ribbon mixer and vertical screw mixer which can shake and agitate or agitate powder materials. Recently available are high-efficiency multifunctional powder mixers manufactured by combining a plurality of agitation devices, such as Super Mixer (manufactured by KAWATA MFG Co., Ltd.), High Speed Mixer (manufactured by Fukae Co., Ltd.), New-Gra Machine (manufactured by Seishin Enterprise Co., Ltd.) and SV Mixer (manufactured by Kobelco Eco-Solutions Co., Ltd.), and those mixers can be employed.

In the coating step, the mixture of the heat-expandable microspheres and fine particles prepared in the mixing step is heated at a temperature higher than the softening point of the thermoplastic resin shell of the microspheres, and the heat-expandable microspheres are expanded and simultaneously coated with the fine particles on the outer surface of their shell.

The heat-expandable microspheres can be heated by a commonly used mixer dryer with a contact heating system or direct heating system. The function of the mixer dryer is not specifically restricted, and the mixer dryer should preferably have the function of dispersing and mixing powder material under a controlled temperature, and optionally have a decompression device for accelerating the drying operation or a cooling device. The heating device is not specifically restricted, and includes, for example, Loedige Mixer (manufactured by Matsubo Corporation) and Solidaire (manufactured by Hosokawa Micron Corporation).

The heating temperature should be fixed at the optimum expansion temperature for the heat-expandable microspheres to be heated, and the temperature should preferably range from 60 to 250° C., more preferably from 70 to 230° C. and further more preferably from 80 to 220° C.

Compositions and Formed Articles

The composition of the present invention comprises a base component and at least one selected from the group consisting of the heat-expandable microspheres, the hollow resin particles and the fine-particle-coated hollow resin particles mentioned above.

The base component is not specifically restricted, and includes, for example, rubbers, such as natural rubbers, butyl rubber, silicone rubber and ethylene-propylene-diene rubber (EPDM); thermosetting resins, such as unsaturated polyester resins, epoxy resins and phenolic resins; waxes, such as polyethylene waxes and paraffin waxes; thermoplastic resins, such as ethylene-vinyl acetate copolymer (EVA), ionomers, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resin (nylon 6, nylon 66, etc.), polycarbonate, polyethylene terephthalate (PET), polybutylene terephthalate (PBT), polyacetal (POM) and polyphenylene sulfide (PPS); thermoplastic elastomers, such as olefin elastomers and styrene elastomers; bioplastics, such as polylactic acid (PLA), cellulose acetate, PBS, PHA and starch resins; sealing materials, such as silicones, modified silicones, polysulfides, modified polysulfides, urethanes, acrylates, polyisobutylenes and butyl rubbers; paint ingredients, such as urethane polymers, ethylene-vinyl acetate copolymers, vinyl chloride polymers and acrylate polymers; and inorganic materials, such as cement, mortar and cordierite. One of or a combination of at least two of those base components can be used.

The composition of the present invention can comprise other components optionally selected according to the application in addition to the hollow resin particles and base component.

The composition of the present invention is prepared by mixing the base component and at least one selected from the heat-expandable microspheres, hollow resin particles and the fine-particle-coated hollow resin particles. The composition of the present invention can also be prepared by mixing another base component with the composition prepared by mixing the base component and at least one selected from the heat-expandable microspheres, hollow resin particles and the fine-particle-coated hollow resin particles.

The amount of the at least one selected from the heat-expandable microspheres, hollow resin particles and fine-particle-coated hollow resin particles to 100 parts by weight of the base component should preferably range from 0.1 to 20 parts by weight, more preferably from 0.3 to 15 parts by weight, further more preferably from 0.5 to 13 parts by weight and yet further more preferably from 1.0 to 10 parts by weight. An amount of the at least one selected from the heat-expandable microspheres, hollow resin particles and fine-particle-coated hollow resin particles within the above range makes a lightweight composition which retains the desirable property of the base component.

The method of mixing is not specifically restricted and preferably includes, for example, mixing with a kneader, roller kneader, mixing roller, mixer, single screw extruder, twin screw extruder or multi-screw extruder.

The hollow resin particles manufactured by expanding the heat-expandable microspheres of the present invention resist the deformation of their shell against a high external pressure load as mentioned above. Thus, it is expected that the hollow resin particles can be used in those application fields where conventional hollow resin particles could not satisfy the requirement for a lightweight filler. Such application fields include, for example, paint compositions and adhesive compositions.

The deformation rate of the shell of hollow resin particles, R, in a paint composition or adhesive composition, which is prepared by mixing the hollow resin particles manufactured by expanding the heat-expandable microspheres of the present invention with a paint or sealant material and subjected to a high pressure load, is not specifically restricted and should preferably be not higher than 85%, more preferably not higher than 55%, further more preferably not higher than 35%, yet further more preferably not higher than 20% and most preferably not higher than 15%.

Hollow resin particles with the shell deformation rate, R, higher than 85% can fail to lighten a composition comprising the hollow resin particles and a base component or a formed article manufactured from a composition comprising the hollow resin particles and a base component.

The deformation rate of the shell of hollow resin particles, R, is described in detail in the Examples.

The composition of the present invention can be used as a master batch for resin molding if the composition comprises the heat-expandable microspheres and the base component including a compound and/or thermoplastic resin having a melting point lower than the expansion initiation temperature of the heat-expandable microspheres (for example, waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polycarbonate, polyethylene terephthalate (PET) and polybutylene terephthalate (PBT); ionomer resins, such as ethylene ionomers, urethane ionomers, styrene ionomers and fluorine ionomers; and thermoplastic elastomers, such as olefin elastomers, styrene elastomers and polyester elastomers). The master batch composition for resin molding is preferably employed in injection molding, extrusion molding and press molding for the purpose of introducing bubbles into molded articles. Resins used for resin molding can be selected from the base component mentioned above without restriction, and include, for example, ethylene-vinyl acetate copolymer (EVA), polyethylene, modified polyethylene, polypropylene, modified polypropylene, modified polyolefin, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resins (nylon 6, nylon 66, etc.), modified polyamide, polycarbonate, polyethylene terephthalate (PET), polybutylene terephthalate (PBT), polyacetal (POM), polyphenylene sulfide (PPS), polyphenylene ether (PPE), modified polyphenylene ether, ionomer resins, olefin elastomers, styrene elastomers, polyester elastomers, polylactic acid (PLA), cellulose acetate, PBS, PHA, starch resins, natural rubbers, isoprene rubber (IR), butadiene rubber (BR), styrene-butadiene rubber (SBR), chloroprene rubber (CR), nitrile rubber (NBR), butyl rubber, silicone rubber, acrylic rubber, urethane rubber, fluorine rubber, ethylene-propylene-diene rubber (EPDM), and their mixtures. The composition can optionally contain reinforcement fibers, such as glass fiber, carbon fiber and natural fibers; inorganic powders, such as talc, titanium oxide, silica and inorganic pigments; organic powders, such as polymer particulates including acrylic particulates, styrene particulates, urethane particulates and silicone particulates, and organic pigments; flame retardants; and chemical blowing agents.

The formed article of the present invention is manufactured by forming or molding the composition mentioned above. The formed article of the present invention includes, for example, coatings and molded products.

The formed article of the present invention has a light-weight property, porosity, sound absorbency, thermal insulation property, low thermal conductivity, permittivity-decreasing property, design potential, shock absorbing performance, strength, and chipping resistance, which have been efficiently improved. In addition, the molded article of the present invention is expected to retain a stable shape against sink marks or distortion, minimize contraction and attain high dimensional stability.

The formed articles containing inorganic materials as the base component can be further burned for processing into ceramic filters and the like.

Examples

Specific examples of the heat-expandable microspheres of the present invention are described below. However, the present invention should not be construed as being restricted within the scope of these examples. In the following Examples and Comparative Examples, "%" means "wt %" unless otherwise specified. In the following description, heat-expandable microspheres may be referred to as "microspheres" for the sake of brevity. The properties and performances of the heat-expandable microspheres, hollow resin particles and fine-particle-coated hollow resin particles are tested or evaluated in the procedures mentioned below.

Volume Mean Particle Size ($D_{50}$) and Particle Size Distribution of Heat-Expandable Microspheres A Microtrac particle size analyzer (9320-HRA, manufactured by Nikkiso Co., Ltd.) was employed for determining $D_{50}$ based on the volume of the microspheres and defined as the volume mean particle size.

Mean Particle Size of Hollow Resin Particles

A sample of hollow resin particles was analyzed in a dry system of a laser diffraction particle size analyzer (MASTRSIZER 3000, manufactured by Malvern). The mean particle size, $D_{50}$, determined based on the volume of the particles in the analysis was defined as the mean particle size.

Expansion-Initiation Temperature ($T_s$) and the Maximum Expansion Temperature ($T_{max}$) of Heat-Expandable Microspheres The maximum expansion temperature was determined with a DMA (DMA Q800, manufactured by TA Instruments). In an aluminum cup 4.8 mm deep and 6.0 mm in diameter, 0.5 mg of a sample of heat-expandable microspheres was placed, and the sample was covered with a piece of aluminum foil (5.6 mm in diameter and 0.1 mm thick) to prepare a test sample. The test sample was set on the device and subjected to a pressure of 0.01 N with the compression unit of the device, and the height of the sample was measured. The sample was then heated by elevating the temperature at a rate of 10° C./min from 20 to 300° C., while being subjected to a pressure of 0.01 N with the compression unit, and the change in the height of the sample was measured. The temperature at which the height started to increase was determined as the expansion-initiation temperature ($T_s$) of the heat-expandable microspheres, and the temperature at which the compression unit indicated the highest position was determined as the maximum expansion temperature ($T_{max}$) of the heat-expandable microspheres.

True Specific Gravity ($d_1$) of Heat-Expandable Microspheres

The true specific gravity ($d_1$) of the heat-expandable microspheres was determined in the following procedure.

Specifically, the true specific gravity of the heat-expandable microspheres was determined by the liquid substitution method (Archimedean method) with isopropyl alcohol in an atmosphere at 25° C. and 50% RH (relative humidity) as described below.

At first, an empty 100-mL measuring flask was dried and weighed ($W_{B1}$ [g]). Then, isopropyl alcohol was poured into the weighed measuring flask accurately to form a meniscus, and the measuring flask filled with isopropyl alcohol was weighed ($W_{B2}$ [g]). The 100-mL measuring flask was then emptied, dried, and weighed ($W_{S1}$ [g]). About 50 mL of the heat-expandable microspheres were placed in the weighed measuring flask, and the measuring flask containing the heat-expandable microspheres was weighed ($W_{S2}$ [g]). Then isopropyl alcohol was poured into the measuring flask containing the heat-expandable microspheres to form a meniscus accurately without taking bubbles into the isopropyl alcohol, and the flask containing the heat-expandable microspheres and isopropyl alcohol was weighed ($W_{S3}$ [g]). The values, $W_{B1}$, $W_{B2}$, $W_{S1}$, $W_{S2}$, and $W_{S3}$, were introduced into the following formula to calculate the true specific gravity (di) of the heat-expandable microspheres.

$$d_1 = [(W_{S2}-W_{S1}) \times (W_{B2}-W_{B1})/100]/[(W_{B2}-W_{B1})-(W_{S3}-W_{S2})]$$

True Specific Gravity ($d_2$) of Hollow Resin Particles

The true specific gravity ($d_2$) of hollow resin particles was determined in the same manner as in the determination of the true specific gravity ($d_1$) of the heat-expandable microspheres mentioned above.

True Specific Gravity ($d_3$) of Fine-Particle-Coated Hollow Resin Particles

The true specific gravity ($d_3$) of fine-particle-coated hollow resin particles was determined in the same manner as in the determination of the true specific gravity (di) of the heat-expandable microspheres mentioned above.

True Specific Gravity ($d_4$) of Hollow Resin Particles Contained in Fine-Particle-Coated Hollow Resin Particles The true specific gravity ($d_4$) of the hollow resin particles contained in fine-particle-coated hollow resin particles was determined in the following procedure.

At first, the fine particles coating the hollow resin particles was flushed out in pretreatment. Specifically, the fine-particle-coated hollow resin particles were mixed with water and, if necessary, with an acid or base, and the mixture was stirred to decompose or flush out the fine particles. Then, the mixture was filtered to be separated into solid and liquid portions. The treatments were repeated several times until hollow resin particles without the fine particles were obtained. In the case that the hollow resin particles are coated with fine particles of calcium carbonate or magnesium hydroxide, the fine particles can be removed by washing with hydrochloric acid followed with rinsing in water several times to obtain hollow resin particles without the fine particles.

Then, the resultant hollow resin particles were dried. The true specific gravity ($d_4$) of the resultant hollow resin particles was determined in the same manner as in the determination of the true specific gravity (d1) of the heat-expandable microspheres mentioned above.

Moisture Content of Heat-Expandable Microspheres and (Fine-Particle-Coated) Hollow Resin Particles The moisture content of a sample of heat-expandable microspheres and (fine-particle-coated) hollow resin particles was determined with a Karl Fischer moisture meter (MKA-510N, manufactured by Kyoto Electronics Manufacturing Co., Ltd.). The moisture content (wt %) of the heat-expandable microspheres and (fine-particle-coated) hollow resin particles was respectively represented by $C_{w1}$ and $C_{w2}$.

$C_{w1}$: moisture content (wt %) of heat-expandable microspheres $C_{w2}$: moisture content (wt %) of (fine-particle-coated) hollow resin particles Encapsulation Ratio of a Blowing Agent ($C_1$) in Heat-Expandable Microspheres 1.0 g of a sample of heat-expandable microspheres was placed in a stainless-steel evaporating dish 15 mm deep and 80 mm in diameter, and weighed ($W_1$ [g]). Then, 30 mL of acetonitrile was added to disperse the microspheres uniformly. After being left for 24 hours at room temperature, the sample was dried under reduced pressure at 130° C. for 2 hours, and the dry weight ($W_2$ [g]) was determined. The encapsulation ratio of the blowing agent ($C_1$) in the heat-expandable microspheres was calculated by the following formula:

$$C_1 \text{ (wt \%)} = 100 \times \{100 \times (W_1 - W_2)/1.0 - C_{w1}\}/(100 - C_{w1})$$

where the moisture content of the heat-expandable microspheres, $C_{w1}$, was measured in the method mentioned above.

Encapsulation Ratio of a Blowing Agent ($C_2$) in Hollow Resin Particles $W_3$ g of a sample of hollow resin particles was placed in a stainless-steel evaporating dish 15 mm deep and 80 mm in diameter, and weighed ($W_4$ [g]). $W_3$ g usually ranges from 0.2 to 0.5 g. Then, 30 mL of acetonitrile was added to disperse the particles uniformly. After being left for 30 minutes at room temperature, the particles were dried under reduced pressure at 130° C. for 2 hours, and the dry weight ($W_5$ [g]) was determined.

The encapsulation ratio of the blowing agent ($C_2$) in the hollow resin particles was calculated by the following formula:

$$C_2 \text{ (wt \%)} = 100 \times \{100 \times (W_4 - W_5)/W_3 - C_{w2}\}/(100 - C_{w2})$$

where the moisture content of the hollow resin particles, $C_{w2}$, was measured in the method mentioned above.

Encapsulation Ratio of a Blowing Agent ($C_3$) in Hollow Resin Particles of Fine-Particle-Coated Hollow Resin Particles The encapsulation ratio of a blowing agent ($C_3$) in the hollow resin particles of fine-particle-coated hollow resin particles was determined in the following procedure.

At first, the fine particles coating the hollow resin particles was flushed out in pretreatment. Specifically, the fine-particle-coated hollow resin particles were mixed with water and, if necessary, with an acid or base, and the mixture was stirred to decompose or flush out the fine particles. Then the mixture was filtered to be separated into solid and liquid portions. The treatments were repeated several times until hollow resin particles without the fine particles were obtained.

Then the resultant hollow resin particles were dried. The encapsulation ratio of the blowing agent ($C_3$) in the hollow resin particles was determined in the same manner as in the determination of the encapsulation ratio of a blowing agent ($C_2$) in the hollow resin particles mentioned above.

Maximum Expansion Ratio of Heat-Expandable Microspheres ($R_{ex}$)

The maximum expansion ratio of heat-expandable microspheres is defined as the ratio of the volume of heat-expandable microspheres at their maximum expansion to the volume of the heat-expandable microspheres before expansion.

In an aluminum container (C-1, manufactured by AS ONE Corporation), 1 g of a sample of heat-expandable microspheres was placed and sealed with aluminum foil. The container was placed in an oven (PHH-102, manufactured by Espec Corp.) the temperature of which was checked to have stabilized.

The true specific gravity of the heat-expandable microspheres after the heating (expanding) was determined in the same manner as described above.

The heat-expandable microspheres were heated in the oven at several temperature levels, which are within the range from their expansion initiation temperature determined in the procedure mentioned above to a temperature 100° C. higher than their maximum expansion temperature, respectively, for 2 minutes at each temperature level. The lowest true specific gravity of the resultant expanded microspheres was taken as the maximum expansion of the microspheres for determining their maximum expansion ratio. The maximum expansion ratio of heat-expandable microspheres ($R_{ex}$) was calculated by the following formula.

$d_1$: true specific gravity of heat-expandable microspheres before expansion $d_5$: true specific gravity of heat-expandable microspheres at their maximum expansion (or true specific gravity of hollow resin particles expanded to the maximum)

$$R_{ex} = d_1/d_5$$

Pressure Resistance

A vinyl chloride paste was prepared by blending 56 parts by weight of vinyl chloride resin, 92 parts by weight of diisononyl phthalate as a plasticizer and 52 parts by weight of calcium carbonate as a filler. The resultant vinyl chloride paste had a specific gravity of 1.3. A prescribed amount of hollow resin particles or fine-particle-coated hollow resin particles was blended with the vinyl chloride paste, and the bubbles in the blend were eliminated to prepare a vinyl chloride compound having a specific gravity of 1.0. The specific gravity, 1.0, of the vinyl chloride compound was confirmed by the determination according to JIS K-5600 with a specific gravity cup.

About 180 mL of each of the vinyl chloride compounds prepared as described above was poured in a pressure-tight container and pressurized with a press under the respective conditions; (i) at 20 MPa for 20 minutes, (ii) at 20 MPa for 1 hour, (iii) at 20 MPa for 5 hours, and (iv) at 20 MPa for 24 hours. After pressurizing, the foam in the compound was eliminated with a stirring defoamer, and the specific gravity of the compound was determined by using a 50-mL specific gravity cup to evaluate the durability of the hollow resin particles and fine-particle-coated hollow resin particles against deformation by external pressure.

In addition, the compounds after the pressurization were observed through an optical microscope to inspect the state of the hollow resin particles and fine-particle-coated hollow resin particles.

Deformation Ratio, R, of Hollow Resin Particles after the Pressure Resistance Test A vinyl chloride compound with a specific gravity of 1.0 was prepared by blending a prescribed amount of hollow resin particles or fine-particle-coated hollow resin particles with the vinyl chloride paste, (with a specific gravity of 1.3) which was the same as used in the pressure resistance test described above.

About 180 mL of the vinyl chloride compound prepared as described above was poured in a pressure-tight container and pressurized with a press at 20 MPa for 1 hour to evaluate the pressure resistance of the particles. After the pressure resistance test, the foam in the compound was eliminated with a stirring defoamer and the specific gravity of the compound (dc) was determined using a 50-mL specific gravity cup.

The true specific gravity ($d_d$) of the hollow resin particles or fine-particle-coated hollow resin particles after the pressure resistance test was calculated by the following formula from the specific gravity of the compound ($d_c$) determined in the pressure resistance test, the true specific gravity ($d_a$) and weight ($W_a$) of the blended vinyl chloride paste and the weight ($W_b$) of the blended hollow resin particles or fine-particle-coated hollow resin particles.

The deformation ratio, R, of the hollow resin particles was calculated from the true specific gravity ($d_d$) of the hollow resin particles or fine-particle-coated hollow resin particles after the pressure resistance test and the true specific gravity ($d_b$) of the hollow resin particles or fine-particle-coated hollow resin particles before the pressure resistance test by the following formula.

$$d_d = W_b / [\{(W_a + W_b) - d_c \times (W_a/d_a)\}/d_c]$$

$$R = \{1 - (d_b/d_d)\} \times 100$$

The resultant deformation ratio, R, was evaluated by the following criteria.

A (preferable): 55≥R
B (acceptable): 85≥R>55
C (unacceptable): R>85

Microspheres 1 of Example 1

An aqueous dispersion medium was prepared by dissolving 126 parts of sodium chloride in 500 parts of deionized water, adding 0.45 parts of polyvinyl pyrolidone, 0.1 part of carboxymethylated polyethylene imine sodium salt (CM-PEI) and 40 parts of colloidal silica containing 20 wt % of silica and adjusting the pH at 3.0.

An oily mixture was prepared by mixing and dissolving 120 parts of acrylonitrile, 120 parts of methacrylonitrile, 2.3 parts of polybutadiene diacrylate (CN-307, manufactured by Sartomer), 3 parts of di(2-ethylhexyl) peroxydicarbonate (P-OPP) and 30 parts of isobutane.

The aqueous dispersion medium and the oily mixture were mixed and agitated with a Homo-mixer (TK Homomixer, manufactured by Primix Corporation) at 10,000 rpm for 1 min to prepare a suspension. Then, the suspension was transferred to a compressive reactor of 1.5-liter capacity, purged with nitrogen and polymerized at 60° C. for 20 hours with agitation at 80 rpm under the initial reaction pressure of 0.35 MPa. The resultant polymerization product was filtered and dried to prepare heat-expandable microspheres 1. The properties of the resultant heat-expandable microspheres are shown in Table 1.

Microspheres 2 to 11 and 16 to 20 of Examples 2 to 16

The heat-expandable microspheres 2 to 11 and 16 to 20 were produced in the same manner as in Example 1; except that the polybutadiene diacrylate (CN-307, manufactured by Sartomer), which was used in Example 1 as the cross-linkable monomer (A), was used in a different amount in Examples 8, 10, 12, 13, 15 and 16, the polybutadiene diacrylate (BAC-45, manufactured by Osaka Organic Chemical Industry Ltd.) was used as the cross-linkable monomer (A) in Examples 2 to 4, 9, 11 and 14 to 16, the urethane bond type polybutadiene having methacrylate groups on both ends (TE-2000, manufactured by Nippon Soda Co., Ltd.) was used as the cross-linkable monomer (A) in Examples 5 and 7, and the ester of polyisoprene-maleic anhydride adduct and 2-hydroxyethyl methacrylate (UC-203M, manufactured by Kuraray Co., Ltd.) was used as the cross-linkable monomer (A) in Examples 6 and 11; and except that the conditions for the reaction were changed as shown in Tables 1 and 2. The properties of the resultant heat-expandable microspheres are shown in Tables 1 and 2.

Microspheres 12 to 15 of Comparative Examples 1 to 4

The heat-expandable microspheres 12 to 15 were produced in the same manner as in Example 1, except that the cross-linkable monomer (A) was not used and the conditions for the reaction were changed as shown in Table 3. The properties of the resultant heat-expandable microspheres were evaluated and are shown in Table 3.

Hollow Resin Particles 1 of Example 1

The microspheres 1 of Example 1 were produced into the hollow resin particles 1 by dry thermal expansion. The dry thermal expansion was conducted by the internal injection method disclosed in Japanese Patent Application Publication 2006-213930. Specifically, the heat-expandable microspheres produced hollow resin particles by thermal expansion with the manufacturing device having the expansion unit shown in FIG. 3 in the procedure mentioned below.

Expansion Unit of the Manufacturing Device

Figure 3:
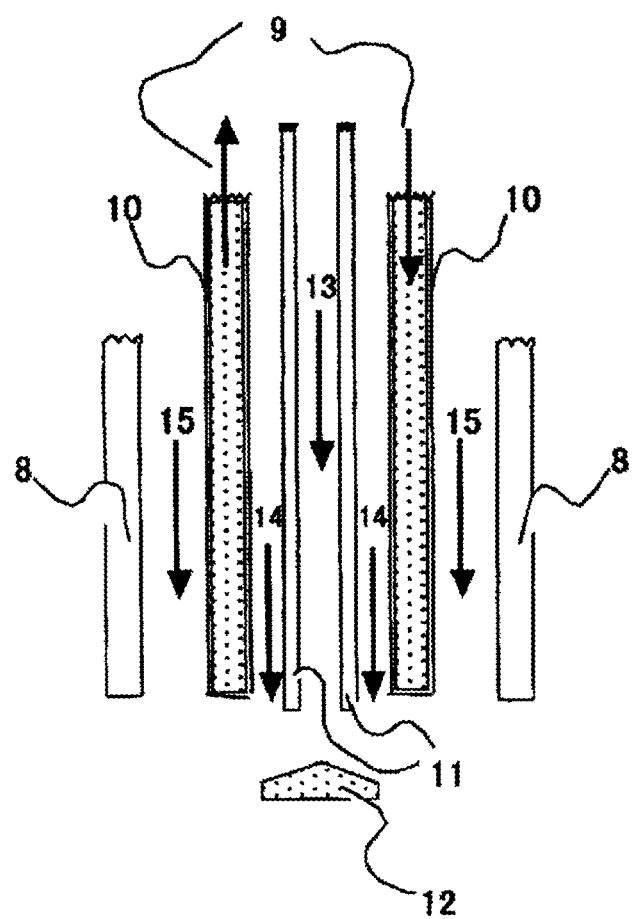
FIG. 3 is a schematic diagram of the expansion unit of a device for manufacturing hollow resin particles by dry thermal expansion.

As shown in FIG. 3, the expansion unit has a gas inlet tube (not indicated by a number) having the distribution nozzle (11) at its outlet and placed at the center of the part, the collision plate (12) disposed below the distribution nozzle (11), the overheat prevention jacket (10) disposed around the gas inlet tube with a clearance from the tube, and the hot air nozzle (8) disposed around the overheat prevention jacket (10) with a clearance from the jacket. A gas fluid (13) containing heat-expandable microspheres is run through the gas inlet tube in the direction of the arrow, and a gas flow (14) is run through the space between the gas inlet tube and the overheat prevention jacket (10) in the direction of the arrows in order to improve the distribution of the heat-expandable microspheres and prevent overheating of the gas inlet tube and collision plate. Furthermore, a hot airflow (15) is run through the space between the overheat protection jacket (10) and the hot air nozzle (8) in the direction of the arrows in order to thermally expand the heat-expandable microspheres. The hot airflow (15), the gas fluid (13) and the gas flow (14) usually run in the same direction. A refrigerant flow (9) is run in the overheat prevention jacket (10) in the direction of the arrows in order to cool the jacket.

Operation of the Manufacturing Device

In the injection step, the gas fluid (13) containing heat-expandable microspheres is introduced in the gas inlet tube having the distribution nozzle (11) at its outlet and placed at the inside the hot airflow (15), and the gas fluid (13) is injected from the distribution nozzle (11).

In the distribution step, the gas fluid (13) is made to collide with the collision plate (12) disposed below the distribution nozzle (11) and the heat-expandable microspheres are uniformly distributed in the hot airflow (15). The gas fluid (13) injected from the distribution nozzle (11) is lead to the collision plate (12) along with the gas flow (14) and collide with the collision plate.

In the expansion step, the distributed heat-expandable microspheres are heated and expanded in the hot airflow (15) at a temperature higher than their expansion-initiation temperature. Then the resultant hollow resin particles are cooled and collected.

Thermal Expansion Conditions and Result

The hollow resin particles 1 were manufactured by thermally expanding the microspheres 1 produced in Example 1 with the manufacturing device shown in FIG. 3, with the expansion parameters including a feeding rate of the microspheres 1 of 0.8 kg/min, a flow rate of the gas fluid for distributing the microspheres 1 of 0.35 m³/min, a flow rate of the hot airflow of 9.0 m³/min and a temperature of the hot airflow at 270° C. The resultant hollow resin particles 1 had a true specific gravity ($d_2$) of 0.035. The encapsulation ratio of the blowing agent ($C_2$) in the hollow resin particles was 10.1%.

Hollow Resin Particles 6, 9, 14 and 18 of Examples 6, 9 and 14 and Comparative Example 3

The microspheres 6 produced in Example 6 were heated with hot air at 330° C., the microspheres 9 produced in Example 9 were heated with hot air at 280° C., the microspheres 18 produced in Example 14 were heated with hot air at 360° C. and the microspheres 14 produced in Comparative example 3 were heated with hot air at 275° C. to be manufactured into the hollow resin particles 6, 9, 18 and 14, respectively. The properties of the resultant hollow resin particles are shown in Tables 1 to 3.

Fine-Particle-Coated Hollow Resin Particles 2 of Example 2

In Example 2, 30 parts of the microspheres produced in Example 2 and 70 parts of calcium carbonate (Whiten SB Red, with mean particle size about 1.8 μm determined by laser diffractometry, manufactured by Bihoku Funka Kogyo Co., Ltd.) were mixed in a separable flask, and the mixture was heated to 155° C. with agitation over 5 minutes to be manufactured into the fine-particle-coated hollow resin particles 2. The true specific gravity of the fine-particle-coated hollow resin particles was 0.144, and the true specific gravity of the hollow resin particles constituting the fine-particle-coated hollow resin particles was 0.045. The encapsulation ratio of the blowing agent ($C_3$) was 8.6%.

Fine-Particle-Coated Hollow Resin Particles 3 to 5, 7, 8, 10, 11, 16, 17, 19 and 20 of Examples 3 to 5, 7, 8, 10 to 13, 15 and 16

The fine-particle-coated hollow resin particles were manufactured in Examples 3 to 5, 7, 8, 10 to 13, 15 and 16 in the same manner as that of Example 2 according to the formulations shown in Tables 1 and 2. The mixture was heated to 130° C. in Example 3, 155° C. in Example 4, 170° C. in Example 5, 158° C. in Example 7, 175° C. in Examples 8 and 10, 160° C. in Example 11, 170° C. in Examples 12 and 13, 180° C. in Example 15 and 170° C. in Example 16, respectively. The properties of the resultant fine-particle-coated hollow resin particles are shown in Tables 1 and 2.

Fine-Particle-Coated Hollow Resin Particles 12, 13 and 15 of Comparative Examples 1, 2 and 4

The fine-particle-coated hollow resin particles were manufactured in Comparative Examples 1, 2 and 4 in the same manner as in Example 2 according to the formulations shown Table 3. The mixture was heated to 155° C. in Comparative Example 1, 160° C. in Comparative Example 2 and 150° C. in Comparative Example 4, respectively. The properties of the resultant fine-particle-coated hollow resin particles are shown in Table 3.

TABLE 1

| | | | Examples | | | | | | | |
|---|---|---|---|---|---|---|---|---|---|---|
| | | | Micro-spheres 1 | Micro-spheres 2 | Micro-spheres 3 | Micro-spheres 4 | Micro-spheres 5 | Micro-spheres 6 | Micro-spheres 7 | Micro-spheres 8 |
| Heat-expandable microspheres | | | 1 | 2 | 3 | 4 | 5 | 6 | 7 | 8 |
| Aqueous suspension (parts by weight) | Oily mixture | Uncross-linkable monomer | | | | | | | | |
| | | Acrylonitrile | 120 | 168 | 153 | 151 | 192 | 100 | 180 | 175 |
| | | Methacrylonitrile | 120 | 72 | 5 | 65 | 0 | 35 | 45 | 0 |
| | | Methyl methacrylate | 0 | 0 | 82 | 0 | 0 | 9 | 15 | 29 |
| | | Isobornyl methacrylate | 0 | 0 | 0 | 0 | 0 | 0 | 0 | 0 |
| | | Methacrylic acid | 0 | 0 | 0 | 0 | 0 | 0 | 0 | 0 |
| | | Cross-linkable monomer (A) | | | | | | | | |
| | | CN-307 | 2.3 | 0 | 0 | 24 | 48 | 96 | 0 | 36 |
| | | BAC-45 | 0 | 0 | 0 | 0 | 0 | 0 | 0 | 0.8 |
| | | TE-2000 | 0 | 1.1 | 1.5 | 0.4 | 0 | 0 | 0 | 0 |
| | | UC-203M | 0 | 0 | 0 | 0 | 0.5 | 0 | 0 | 0 |
| | | Other cross-linkable monomers | | | | | | | | |
| | | EDMA | 0 | 0 | 0 | 1.6 | 0 | 2 | 1.2 | 0 |
| | | TMP | 0 | 0 | 0 | 0 | 0 | 6 | 0 | 0 |
| | | Polymerization initiator | | | | | | | | |
| | | P-OPP | 3 | 3 | 3 | 0 | 1 | 3 | 0 | 0 |
| | | P-355 | 0 | 0 | 0 | 3 | 2.5 | 0 | 2 | 2 |
| | | V65 | 0 | 0 | 0 | 0 | 0 | 0 | 2 | 2 |
| | | Other polymerization initiators | | | | | | | | |
| | | Dicumyl peroxide | 0 | 0 | 0 | 0 | 0 | 0 | 0 | 0 |
| | | Blowing agent | | | | | | | | |
| | | Propane | 30 | 25 | 22 | 45 | 22 | 30 | 31 | 22 |
| | | Isobutane | 0 | 0 | 15 | 0 | 0 | 0 | 0 | 0 |
| | | Isopentane | 0 | 0 | 0 | 0 | 0 | 0 | 0 | 0 |
| | | Isooctane | 0 | 0 | 0 | 5 | 5 | 10 | 0 | 0 |
| | Aqueous dispersion medium | Deionized water | 500 | 500 | 500 | 500 | 500 | 500 | 500 | 500 |
| | | Electrolyte Sodium chloride | 126 | 126 | 126 | 126 | 126 | 126 | 126 | 126 |
| | | Stabilizing auxiliary Polyvinyl pyrrolidone | 0.45 | 0.35 | 0.4 | 0.4 | 0.3 | 0.25 | 0.3 | 0.3 |
| | | Stabilizer Colloidal silica | 40 | 70 | 62 | 45 | 78 | 68 | 73 | 73 |
| | | CMPEI | 0.1 | 0.1 | 0.1 | 0.1 | 0.1 | 0.1 | 0.15 | 0.15 |
| | | pH | 3 | 3 | 3 | 3 | 3 | 3 | 3 | 3 |
| Properties of heat-expandable microspheres | | Amount of cross-linkable monomer (A) in polymerizable component [wt %] | 0.95 | 0.46 | 0.62 | 0.17 | 0.21 | 0.83 | 0.50 | 0.33 |
| | | Amount of cross-linkable monomer (A) in all cross-linkable monomers [wt %] | 100.0 | 100.0 | 100.0 | 20.0 | 100.0 | 100.0 | 50.0 | 100.0 |
| | | Amount of nitrile monomer in uncross-linkable monomer [wt %] | 100.0 | 100.0 | 65.8 | 90.0 | 80.0 | 56.3 | 93.8 | 72.9 |
| | | Amount of acrylonitrile in uncross-linkable monomer [wt %] | 50.0 | 70.0 | 63.8 | 62.9 | 80.0 | 41.7 | 75.0 | 72.9 |
| | | Volume mean particle size (D$_{50}$) [μm] | 13 | 20 | 30 | 43 | 18 | 22 | 25 | 21 |
| | | True specific gravity (d$_1$) | 1.07 | 1.10 | 1.03 | 1.01 | 1.05 | 1.02 | 1.03 | 1.14 |
| | | Encapsulation ratio of blowing agent in microspheres, C$_1$ [%] | 10.2 | 8.9 | 11.8 | 16.3 | 10.6 | 13.3 | 10.5 | 7.8 |

TABLE 1-continued

| | | Examples | | | | | | | |
|---|---|---|---|---|---|---|---|---|---|
| | | 1 | 2 | 3 | 4 | 5 | 6 | 7 | 8 |
| Expansion performance | Expansion initiation temp. [° C.] | 122 | 118 | 100 | 122 | 149 | 172 | 123 | 158 |
| | Maximum expansion temp. [° C.] | 155 | 163 | 151 | 173 | 185 | 193 | 154 | 192 |
| | Maximum expansion ratio [$R_{ex}$] | 111 | 79 | 125 | 100 | 43 | 111 | 96 | 60 |
| (Fine-particle-coated) hollow resin particles | Hollow resin particles manufactured from microspheres | Hollow resin particles 1 | — | — | — | — | Hollow resin particles 6 | — | — |
| | Fine-particle-coated hollow resin particles manufactured from microspheres | — | Fine-particle-coated hollow resin particles 2 | Fine-particle-coated hollow resin particles 3 | Fine-particle-coated hollow resin particles 4 | Fine-particle-coated hollow resin particles 5 | — | Fine-particle-coated hollow resin particles 7 | Fine-particle-coated hollow resin particles 8 |
| Materials and their amount to manufacture fine-particle-coated hollow resin particles | Microspheres (parts by weight) | — | 30 | 30 | 30 | 40 | — | 30 | 30 |
| | Calcium carbonate (fine particle) (parts by weight) | — | 70 | 70 | 70 | 60 | — | 70 | 70 |
| Properties of (fine-particle-coated) hollow resin particles | Mean particle size of hollow resin particles ($D_{50}$) [μm] | 40.2 | 56.1 | 80.1 | 111 | 55 | 56.3 | 77.2 | 55.4 |
| | True specific gravity of hollow resin particles ($d_3$) | 0.035 | — | — | — | — | 0.06 | — | — |
| | True specific gravity of the hollow resin particles in fine-particle-coated hollow resin particles ($d_4$) | — | 0.045 | 0.052 | 0.058 | 0.037 | — | 0.034 | 0.055 |
| | Encapsulation ratio of blowing agent, $C_2$ [%] | 10.1 | — | — | — | — | 12.9 | — | — |
| | Encapsulation ratio of blowing agent, $C_3$ [%] | — | 8.6 | 11.6 | 16.1 | 10.2 | — | 10.1 | 7.5 |

TABLE 2

| | | | | Examples | | | | | | | |
|---|---|---|---|---|---|---|---|---|---|---|---|
| | | | | 9 | 10 | 11 | 12 | 13 | 14 | 15 | 16 |
| | | | | Micro-spheres 9 | Micro-spheres 10 | Micro-spheres 11 | Micro-spheres 16 | Micro-spheres 17 | Micro-spheres 18 | Micro-spheres 19 | Micro-spheres 20 |
| | | | | 163 | 168 | 168 | 185 | 200 | 150 | 180 | 180 |
| Heat-expandable microspheres | Oily mixture (parts by weight) | Uncross-linkable monomer | Acrylonitrile | 67 | 10 | 72 | 0 | 0 | 30 | 10 | 0 |
| | | | Methacrylonitrile | 10 | 0 | 0 | 8 | 0 | 0 | 0 | 0 |
| | | | Methyl methacrylate | 0 | 0 | 0 | 0 | 0 | 0 | 0 | 10 |
| | | | Isobornyl methacrylate | 0 | 0 | 0 | 0 | 0 | 0 | 0 | 0 |
| | | Cross-linkable monomer (A) | Methacrylic acid | 0 | 62 | 0 | 47 | 40 | 60 | 50 | 50 |
| | | | CN-307 | 0 | 8.5 | 0 | 10 | 12 | 0 | 10 | 20 |
| | | | BAC-45 | 3.8 | 0 | 2 | 0 | 0 | 15 | 8 | 5 |
| | | | TE-2000 | 0 | 0 | 0 | 0 | 0 | 0 | 0 | 0 |
| | | | UC-203M | 0 | 0 | 2 | 0 | 0 | 0 | 0 | 0 |
| | | Other cross-linkable monomers | EDMA | 0 | 0 | 0 | 0 | 0 | 0 | 0 | 0 |
| | | | TMP | 0 | 0 | 0 | 0 | 0 | 0 | 0 | 0 |
| | | Polymerization initiator | P-OPP | 3 | 3 | 0 | 1 | 0 | 3 | 3 | 0 |
| | | | P-355 | 0 | 0 | 0 | 3 | 3 | 0 | 0 | 0 |
| | | | V65 | 0 | 1 | 3 | 0 | 1 | 0 | 1 | 3 |
| | | Other polymerization initiators | Dicumyl peroxide | 0 | 0 | 0 | 0 | 0 | 1 | 5 | 5 |
| | | Blowing agent | Propane | 0 | 0 | 0 | 0 | 0 | 0 | 0 | 0 |
| | | | Isobutane | 33 | 60 | 25 | 31 | 30 | 30 | 30 | 30 |
| | | | Isopentane | 0 | 5 | 0 | 0 | 0 | 0 | 5 | 0 |
| | | | Isooctane | 0 | 0 | 0 | 0 | 0 | 0 | 0 | 0 |
| | Aqueous dispersion medium | Deionized water | | 500 | 500 | 500 | 500 | 500 | 500 | 500 | 500 |
| | | Electrolyte | Sodium chloride | 126 | 126 | 126 | 126 | 126 | 126 | 126 | 126 |
| | | Stabilizing auxiliary | Polyvinyl pyrrolidone | 0.3 | 0.3 | 0.3 | 0.3 | 0.3 | 0.3 | 0.3 | 0.3 |
| | | Stabilizer | Colloidal silica | 70 | 58 | 70 | 73 | 73 | 70 | 58 | 70 |
| | | | CMPEI | 0.15 | 0.15 | 0.15 | 0.15 | 0.15 | 0.15 | 0.15 | 0.15 |
| | | pH | | 3 | 3 | 3 | 3 | 3 | 3 | 3 | 3 |
| Properties of heat-expandable microspheres | | Amount of cross-linkable monomer (A) in polymerizable component [wt %] | | 1.56 | 3.42 | 1.64 | 4.00 | 4.76 | 5.88 | 6.98 | 9.43 |
| | | Amount of cross-linkable monomer (A) in all cross-linkable monomers [wt %] | | 100.0 | 100.0 | 100.0 | 100.0 | 100.0 | 100.0 | 100.0 | 100.0 |
| | | Amount of nitrile monomer in uncross-linkable monomers [wt %] | | 95.8 | 74.2 | 100.0 | 77.1 | 83.3 | 75.0 | 79.2 | 75.0 |
| | | Amount of acrylonitrile in uncross-linkable monomer [wt %] | | 67.9 | 70.0 | 70.0 | 77.1 | 83.3 | 62.5 | 75.0 | 75.0 |
| | | Volume mean particle size ($D_{50}$) [μm] | | 25 | 30 | 20 | 30 | 25 | 31 | 27 | 21 |
| | | True specific gravity ($d_1$) | | 1.02 | 0.99 | 1.1 | 1.05 | 1.04 | 1.04 | 1.03 | 1.06 |
| | | Encapsulation ratio of blowing agent in microspheres, $C_1$ [%] | | 11.3 | 19.8 | 9.1 | 10.5 | 10.2 | 10 | 11.3 | 9.8 |

TABLE 2-continued

| | | Examples | | | | | | | |
|---|---|---|---|---|---|---|---|---|---|
| | | 9 | 10 | 11 | 12 | 13 | 14 | 15 | 16 |
| Expansion performance | Expansion initiation temp. [° C.] | 121 | 163 | 118 | 155 | 145 | 165 | 148 | 150 |
| | Maximum expansion temp. [° C.] | 153 | 193 | 157 | 185 | 173 | 178 | 160 | 158 |
| | Maximum expansion ratio [$R_{ex}$] | 96 | 70 | 100 | 80 | 70 | 40 | 20 | 16 |
| (Fine-particle-coated) hollow resin particles | Hollow resin particles manufactured from microspheres | Hollow resin particles 9 | — | — | — | — | Hollow resin particles 18 | — | — |
| | Fine-particle-coated hollow resin particles manufactured from microspheres | — | Fine-particle-coated hollow resin particles 10 | Fine-particle-coated hollow resin particles 11 | Fine-particle-coated hollow resin particles 16 | Fine-particle-coated hollow resin particles 17 | — | Fine-particle-coated hollow resin particles 19 | Fine-particle-coated hollow resin particles 20 |
| | Materials and their amount to manufacture fine-particle-coated hollow resin particles | Microspheres (parts by weight) | — | 25 | 30 | 30 | 40 | — | 50 | 50 |
| | | Calcium carbonate (fine particle) (parts by weight) | — | 75 | 70 | 70 | 60 | — | 50 | 50 |
| Properties of (fine-particle-coated) hollow resin particles | Mean particle size of hollow resin particles ($D_{50}$) [μm] | 76.3 | 76.4 | 55.3 | 88.9 | 71.3 | 88.3 | 66.5 | 54.5 |
| | True specific gravity of hollow resin particles ($d_2$) | 0.061 | — | — | — | — | 0.045 | — | — |
| | True specific gravity of the hollow resin particles in fine-particle-coated hollow resin particles ($d_4$) | — | 0.055 | 0.053 | 0.040 | 0.045 | — | 0.060 | 0.060 |
| | Encapsulation ratio of blowing agent, $C_2$ [%] | 11.0 | — | — | — | — | 9.9 | — | — |
| | Encapsulation ratio of blowing agent, $C_3$ [%] | — | 19.5 | 9.1 | 10.1 | 10.0 | — | 10.2 | 9.3 |

TABLE 3

|  |  |  |  | Comparative examples | | | |
|---|---|---|---|---|---|---|---|
|  |  |  |  | 1 | 2 | 3 | 4 |
| Heat-expandable microspheres |  |  |  | Microspheres 12 | Microspheres 13 | Microspheres 14 | Microspheres 15 |
| Aqueous suspension (parts by weight) | Oily mixture | Uncross-linkable monomer | Acrylonitrile | 168 | 143 | 144 | 225 |
|  |  |  | Methacrylonitrile | 72 | 61 | 96 | 0 |
|  |  |  | Methyl methacrylate | 0 | 0 | 0 | 15 |
|  |  |  | Methacrylic acid | 0 | 36 | 0 | 0 |
|  |  |  | Polybutadiene | 0 | 0 | 3.6 | 0 |
|  |  | Cross-linkable monomer / Other cross-linkable monomers | Triethylene glycol diacrylate | 0.96 | 0.96 | 0 | 0 |
|  |  |  | Dipentaerythritol hexaacrylate | 0 | 0 | 0 | 1.5 |
|  |  | Polymerization initiator | P-OPP | 0 | 3 | 0 | 1.7 |
|  |  |  | AIBN | 2 | 0 | 3.6 | 0 |
|  |  |  | V70 | 1.5 | 0 | 0 | 0 |
|  |  | Blowing agent | Isobutane | 0 | 48 | 0 | 0 |
|  |  |  | Normal pentane | 0 | 0 | 72 | 48 |
|  |  |  | Isopentane | 36 | 0 | 0 | 0 |
|  |  |  | Isooctane | 24 | 0 | 0 | 0 |
|  | Aqueous dispersion medium | Deionized water |  | 550 | 550 | 550 | 550 |
|  |  | Electrolyte | Sodium chloride | 130 | 130 | 130 | 130 |
|  |  | Stabilizing auxiliary | Polyvinyl pyrolidone | 0.7 | 0.7 | 0.7 | 0.7 |
|  |  | Stabilizer | Colloidal silica | 67 | 80 | 80 | 70 |
|  |  | Additive | Sodium nitrite | 0.18 | 0.18 | 0.24 | 0 |
|  |  |  | Potassium chromate (2.5-% aqueous solution) | 0 | 0 | 0 | 0.45 |
|  |  | pH |  | 3 | 3 | 3 | 3 |
| Propertied of heat-expandable microspheres | Amount of cross-linkable monomer (A) in polymerizable component [wt %] |  |  | 0.00 | 0.00 | 0.00 | 0.00 |
|  | Amount of cross-linkable monomer (A) in all cross-linkable monomers [wt %] |  |  | 0.0 | 0.0 | 0.0 | 0.0 |
|  | Amount of nitrile monomer in uncross-linkable monomer [wt %] |  |  | 100.0 | 85.0 | 98.5 | 93.8 |
|  | Amount of acrylonitrile in uncross-linkable monomer [wt %] |  |  | 70.0 | 59.6 | 59.1 | 93.8 |
|  | Volume mean particle size ($D_{50}$) [μm] |  |  | 31 | 25 | 20 | 33 |
|  | True specific gravity ($d_1$) |  |  | 0.97 | 1.02 | 0.96 | 1.01 |
|  | Encapsulation ratio of blowing agent in microspheres, $C_1$ [%] |  |  | 19.2 | 15.3 | 22.2 | 15.7 |
|  | Expansion performance | Expansion initiation temp. [° C.] |  | 125 | 143 | 123 | 103 |
|  |  | Maximum expansion temp. [° C.] |  | 173 | 167 | 158 | 141 |
|  |  | Maximum expansion ratio [$R_{ex}$] |  | 105 | 110 | 96 | 123 |
| (Fine-particle-coated) hollow particles spheres | Hollow resin particles manufactured from microspheres |  |  | — | — | Hollow resin particles 14 | — |
|  | Fine-particle-coated hollow resin particles manufactured from microspheres |  |  | Fine-particle-coated hollow resin particles 12 | Fine-particle-coated hollow resin particles 13 | — | Fine-particle-coated hollow resin particles 15 |
|  | Materials and their amount to manufacture fine-particle-coated hollow resin particles | Microspheres (parts by weight) |  | 30 | 30 | — | 30 |
|  |  | Calcium carbonate (fine particle) (parts by weight) |  | 70 | 70 | — | 70 |
| Properties of (fine-particle-coated) hollow resin particles | Mean particle size of hollow resin particles ($D_{50}$) [μm] |  |  | 95.2 | 70.4 | 56.3 | 92.8 |
|  | True specific gravity of hollow resin particles ($d_2$) |  |  | — | — | 0.045 | — |
|  | True specific gravity of the hollow resin particles in fine-particle-coated hollow resin particles ($d_4$) |  |  | 0.035 | 0.045 | — | 0.045 |
|  | Encapsulation ratio of blowing agent, $C_2$ [%] |  |  | — | — | 21.9 | — |
|  | Encapsulation ratio of blowing agent, $C_3$ [%] |  |  | 18.9 | 14.7 | — | 15.4 |

Test 1

A vinyl chloride compound was prepared by adding 1.67 parts of the hollow resin particles manufactured in Example 1 to a vinyl chloride resin sol (having a specific gravity of 1.3) prepared by blending 56 parts of vinyl chloride resin (ZEST-P-21, manufactured by Tokuyama Corporation), 92 parts of diisononyl phthalate and 52 parts of calcium carbonate, kneading the mixture and eliminating bubbles by a stirring defoamer. The result compound had a true specific gravity of 1.0.

Then, the durability of the compound against deformation by external pressure load was tested in the procedure mentioned above. The result is shown in Table 4. The hollow resin particles of the present invention exhibit a low deformation ratio owing to their property of resisting deformation against an external pressure load and minimize the change of specific gravity of the compound before and after compression to sufficiently exert their lightweight effect.

Tests 2 to 20

In tests 2 to 20, the compounds were prepared and tested in the same manner as in Test 1 except that the (fine-particlecoated) hollow resin particles shown in Table 4 were used as the lightweight filler. The results are shown in Tables 4 to 6.

Figure 4:
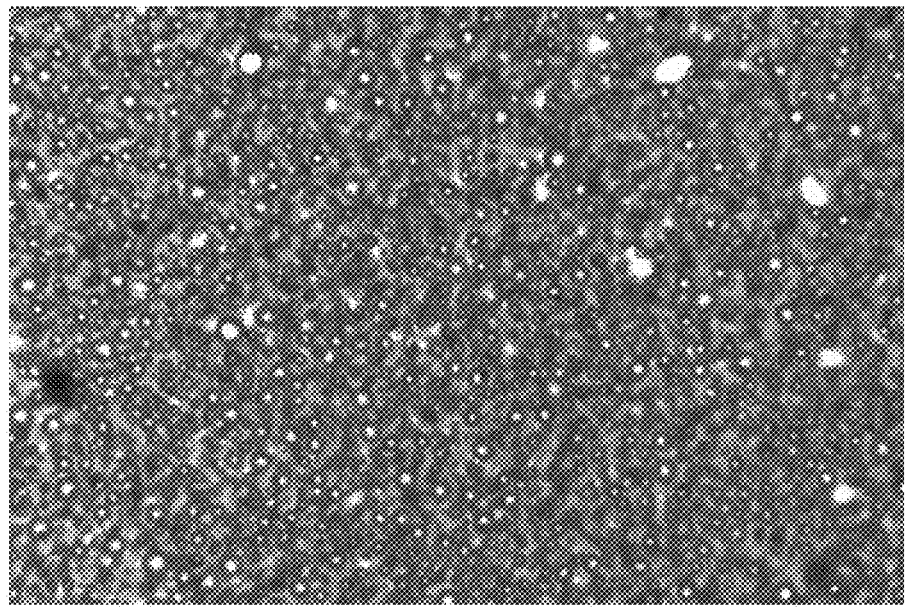
FIG. 4 is an optical photomicrograph of a compound before pressurizing at 20 MPa for 1 hour in Test 2.
Figure 5:
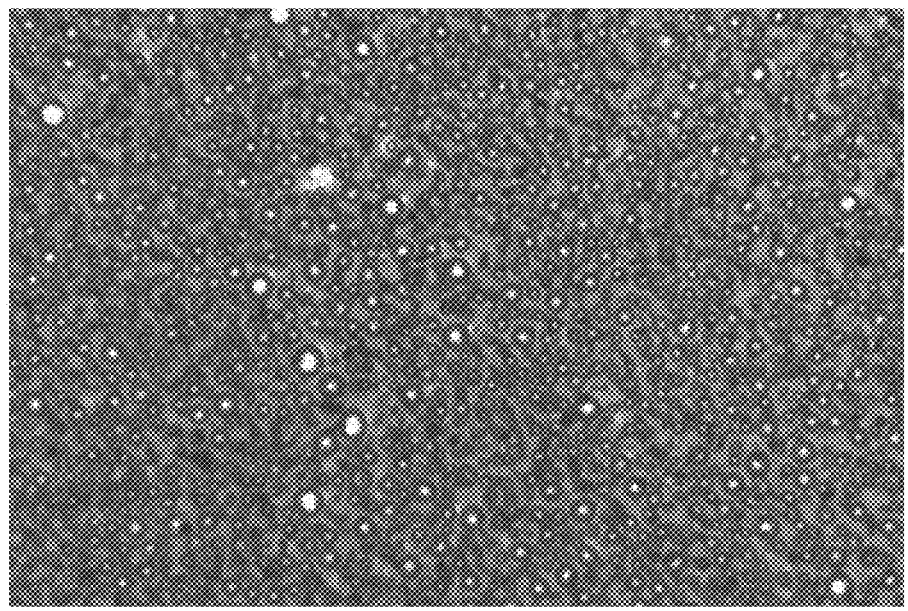
FIG. 5 is an optical photomicrograph of a compound pressurized at 20 MPa for 1 hour in Test 2

The compound after pressurization at 20 MPa for 1 hour in Test 2 was observed through optical microscope to inspect the state of the fine-particle-coated hollow resin particles in the compound. The state of the fine-particle-coated hollow resin particles before the test is shown in FIG. 4, and the state of the fine-particle-coated hollow resin particles after the test is shown in FIG. 5. In FIG. 5, large number of remaining fine-particle-coated hollow resin particles were found in the compound of FIG. 5 as compared to FIG. 4.

Figure 6:
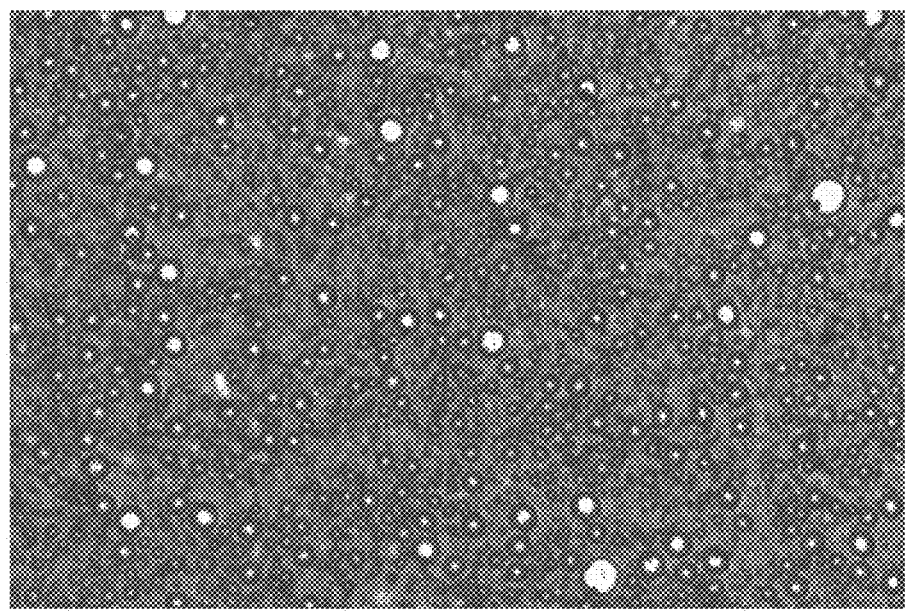
FIG. 6 is an optical photomicrograph of a compound before pressurizing at 20 MPa for 1 hour in Test 14.
Figure 7:
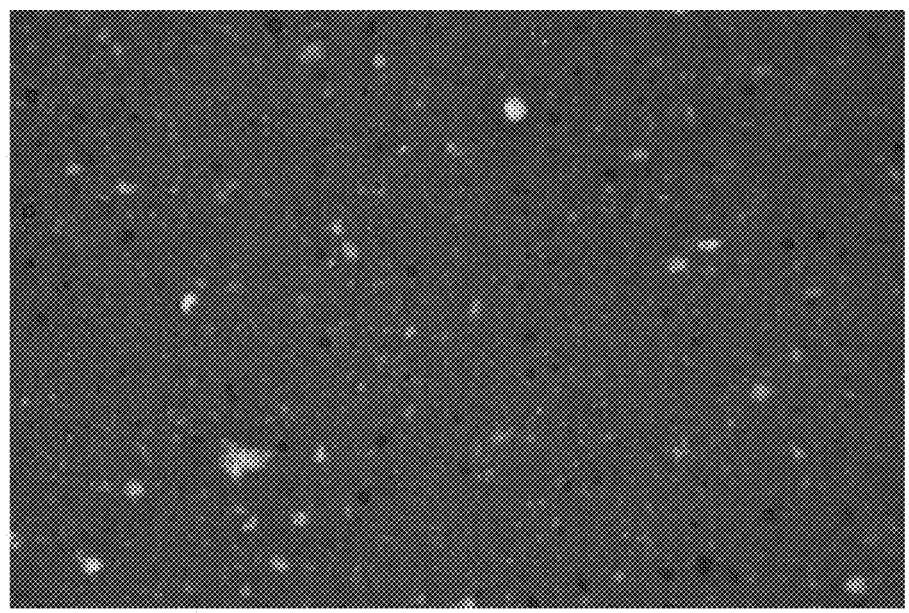
FIG. 7 is an optical photomicrograph of a compound pressured at 20 MPa for 1 hour in Test 14.

On the other hand, all the compounds after pressurization at 20 MPa for 1 hour in Tests 12 to 15 had a specific gravity of 1.31. This demonstrates that the (fine-particle-coated) hollow resin particles in the compounds did not function as a lightweight filler. The compound after pressurizing at 20 MPa for 1 hour in Test 14 was observed through an optical microscope to inspect the state of the hollow resin particles in the compound. The state of the hollow resin particles before the test is shown in FIG. 6, and the state of the hollow resin particles after the test is shown in FIG. 7. In FIG. 7, almost no hollow resin particles remained in the compound as compared to FIG. 6 because of their deformation.

TABLE 4

|  |  |  |  | Test 1 | Test 2 | Test 3 | Test 4 |
|---|---|---|---|---|---|---|---|
| Vinyl chloride compound | Light weight filler | Hollow resin particles |  | Hollow resin particles 1 | Fine-particle-coated hollow resin particles 2 | Fine-particle-coated hollow resin particles 3 | Fine-particle-coated hollow resin particles 4 |
|  |  |  | Amount (part) | 1.67 | 7.76 | 9.19 | 10.41 |
|  |  |  | True specific gravity | 0.035 | 0.144 | 0.166 | 0.184 |
|  |  | Base component | Vinyl chloride paste (part) | 200 | 200 | 200 | 200 |
|  |  |  | Specific gravity | 1.00 | 1.00 | 1.00 | 1.00 |
| Specific gravity of compound after pressurization |  | 20 MPa for 20 min |  | 1.02 | 1.01 | 1.01 | 1.01 |
|  |  | 20 MPa for 1 h |  | 1.04 | 1.05 | 1.04 | 1.05 |
|  |  | 20 MPa for 5 h |  | 1.05 | 1.06 | 1.05 | 1.07 |
|  |  | 20 MPa for 24 h |  | 1.09 | 1.08 | 1.10 | 1.08 |
| Deformation ratio (R) of hollow resin particles after pressurization |  | 20 MPa for 20 min |  | 8.06 | 3.77 | 3.77 | 3.70 |
|  |  | 20 MPa for 1 h |  | 16.03 | 18.31 | 14.56 | 17.73 |
|  |  |  |  | A | A | A | A |
|  |  | 20 MPa for 5 h |  | 19.90 | 21.78 | 18.03 | 24.35 |
|  |  | 20 MPa for 24 h |  | 34.67 | 28.51 | 34.38 | 27.57 |

|  |  |  |  | Test 5 | Test 6 | Test 7 |
|---|---|---|---|---|---|---|
| Vinyl chloride compound | Light weight filler | Hollow resin particles |  | Fine-particle-coated hollow resin particles 5 | Hollow resin particles 6 | Fine-particle-coated hollow resin particles 7 |
|  |  |  | Amount (part) | 4.62 | 2.95 | 5.70 |
|  |  |  | True specific gravity | 0.091 | 0.06 | 0.11 |
|  |  | Base component | Vinyl chloride paste (part) | 200 | 200 | 200 |
|  |  |  | Specific gravity | 1.00 | 1.00 | 1.00 |
| Specific gravity of compound after pressurization |  | 20 MPa for 20 min |  | 1.01 | 1.01 | 1.01 |
|  |  | 20 MPa for 1 h |  | 1.05 | 1.04 | 1.04 |
|  |  | 20 MPa for 5 h |  | 1.05 | 1.05 | 1.06 |
|  |  | 20 MPa for 24 h |  | 1.07 | 1.06 | 1.08 |
| Deformation ratio (R) of hollow resin particles after pressurization |  | 20 MPa for 20 min |  | 3.98 | 4.21 | 3.86 |
|  |  | 20 MPa for 1 h |  | 19.18 | 16.00 | 15.20 |
|  |  |  |  | A | A | A |
|  |  | 20 MPa for 5 h |  | 19.18 | 19.78 | 22.40 |
|  |  | 20 MPa for 24 h |  | 26.36 | 23.49 | 29.34 |

TABLE 5

|  |  |  |  | Test 8 | Test 9 | Test 10 | Test 11 |
|---|---|---|---|---|---|---|---|
| Vinyl chloride compound | Light weight filler | Hollow resin particles |  | Fine-particle-coated hollow resin particles 8 | Hollow resin particles 9 | Fine-particle-coated hollow resin particles 10 | Fine-particle-coated hollow resin particles 11 |
|  |  |  | Amount (part) | 9.79 | 3.00 | 12.05 | 9.39 |
|  |  |  | True specific gravity | 0.175 | 0.061 | 0.207 | 0.169 |
|  |  | Base component | Vinyl chloride paste (part) | 200 | 200 | 200 | 200 |
|  |  |  | Specific gravity | 1.00 | 1.00 | 1.00 | 1.00 |
| Specific gravity of compound after pressurization |  | 20 MPa for 20 min |  | 1.02 | 1.02 | 1.02 | 1.01 |
|  |  | 20 MPa for 1 h |  | 1.04 | 1.03 | 1.05 | 1.05 |
|  |  | 20 MPa for 5 h |  | 1.06 | 1.05 | 1.07 | 1.07 |
|  |  | 20 MPa for 24 h |  | 1.10 | 1.09 | 1.10 | 1.08 |

TABLE 5-continued

| | | | | | | |
|---|---|---|---|---|---|---|
| Deformation ratio (R) of hollow resin particles after pressurization | 20 MPa for 20 min | 7.35 | 8.22 | 7.71 | 3.76 | |
| | 20 MPa for 1 h | 14.42 | 12.15 | 18.83 | 17.98 | |
| | | A | A | A | A | |
| | 20 MPa for 5 h | 21.23 | 19.78 | 25.90 | 24.69 | |
| | 20 MPa for 24 h | 34.09 | 34.21 | 36.02 | 27.95 | |

| | | | | Test 12 | Test 13 | Test 14 |
|---|---|---|---|---|---|---|
| Vinyl chloride compound | Light weight filler | Hollow resin particles | | Fine-particle-coated hollow resin particles 12 | Fine-particle-coated hollow resin particles 13 | Hollow resin particles 14 |
| | | | Amount (part) | 5.88 | 7.76 | 2.17 |
| | | | True specific gravity | 0.113 | 0.144 | 0.045 |
| | Base component | Vinyl chloride paste (part) | | 200 | 200 | 200 |
| | | Specific gravity | | 1.00 | 1.00 | 1.00 |
| Specific gravity of compound after pressurization | | 20 MPa for 20 min | | 1.29 | 1.28 | 1.28 |
| | | 20 MPa for 1 h | | 1.31 | 1.31 | 1.31 |
| | | 20 MPa for 5 h | | 1.31 | 1.31 | 1.31 |
| | | 20 MPa for 24 h | | 1.33 | 1.31 | 1.31 |
| Deformation ratio (R) of hollow resin particles after pressurization | | 20 MPa for 20 min | | 88.95 | 84.29 | 91.50 |
| | | 20 MPa for 1 h | | 93.63 | 91.19 | 99.00 |
| | | | | C | C | C |
| | | 20 MPa for 5 h | | 93.63 | 91.19 | 99.00 |
| | | 20 MPa for 24 h | | 98.17 | 91.19 | 99.00 |

TABLE 6

| | | | Test 15 | Test 16 | Test 17 | Test 18 | Test 19 | Test 20 |
|---|---|---|---|---|---|---|---|---|
| Vinyl chloride compound | Light weight filler | Hollow resin particles | Fine-particle-coated hollow resin particles 15 | Fine-particle-coated hollow resin particles 16 | Fine-particle-coated hollow resin particles 17 | Hollow resin particles 18 | Fine-particle-coated hollow resin particles 19 | Fine-particle-coated hollow resin particles 20 |
| | | Amount (part) | 7.76 | 6.84 | 5.70 | 2.17 | 6.12 | 6.12 |
| | | True specific gravity | 0.144 | 0.13 | 0.11 | 0.045 | 0.12 | 0.12 |
| | Base component | Vinyl chloride paste (part) | 200 | 200 | 200 | 200 | 200 | 200 |
| | | Specific gravity | 1.00 | 1.00 | 1.00 | 1.00 | 1.00 | 1.00 |
| Specific gravity of compound after pressurization | | 20 MPa for 20 min | 1.27 | 1.01 | 1.01 | 1.02 | 1.02 | 1.04 |
| | | 20 MPa for 1 h | 1.31 | 1.03 | 1.03 | 1.04 | 1.04 | 1.05 |
| | | 20 MPa for 5 h | 1.31 | 1.05 | 1.06 | 1.07 | 1.06 | 1.08 |
| | | 20 MPa for 24 h | 1.31 | 1.07 | 1.07 | 1.11 | 1.10 | 1.12 |
| Deformation ratio (R) of hollow resin particles after pressurization | | 20 MPa for 20 min | 81.92 | 3.96 | 3.77 | 7.44 | 7.31 | 15.49 |
| | | 20 MPa for 1 h | 91.19 | 12.08 | 11.18 | 14.56 | 14.33 | 19.18 |
| | | | C | A | A | A | A | A |
| | | 20 MPa for 5 h | 91.19 | 19.90 | 21.78 | 24.75 | 21.07 | 29.85 |
| | | 20 MPa for 24 h | 91.19 | 27.42 | 25.18 | 37.48 | 33.83 | 43.17 |

Some of the compounds in Tables 1 to 3 are represented by the abbreviations shown in Table 7.

TABLE 7

| Abbreviation | Compound |
|---|---|
| CN-307 | Polybutadiene diacrylate, CN-307, molecular weight 3500, $R^1$ and $R^3$ acryloyl group, $R^2$ polybutadiene structure, manufactured by Sartomer |
| BAC-45 | Polybutadiene diacrylate, BAC-45, molecular weight 10000, $R^1$ and $R^3$ acryloyl group, $R^2$ polybutadiene structure, manufactured by Osaka Organic Chemical Industry Ltd.) |
| TE-2000 | Urethane bond type polybutadiene having methacrylate group on both ends being bonded via a urethane bond, TE-2000, molecular weight 2000, $R^1$ and $R^3$ methacryloyl group, $R^2$ urethane-group introduced polybutadiene structure, manufactured by Nippon Soda Co., Ltd) |
| UC-203M | Ester of polyisoprene-maleic anhydride adduct and 2-hydroxyethyl methacrylate, UC-203M, molecular weight 35000, $R^1$ and $R^3$ methacryloyl group, $R^2$ polyisoprene structure partially adducted with maleic anhydride and etherified with 2-hydroxyethyl methacrylate, manufactured by Kuraray Co., Ltd. |
| EDMA | Ethylene glycol dimethacrylate |
| TMP | Trimethylol propane trimethacrylate |
| P-OPP | Di(2-ethylhexyl) peroxydicarbonate |
| P-355 | Di ((3,5,5-trimethylhexanoyl) peroxide |
| V65 | 2,2'-Azobis(2,4-dimethyl valeronitrile) |
| AIBN | 2,2'-Azobis(isobutylonitrile) |
| V70 | 2,2'-Azobis(4-methoxy-2,4-dimethyl valeronitrile) |
| CMPEI | Carboxymethylated polyethylene imine sodium salt |

The present invention provides heat-expandable microspheres processable into hollow resin particles that can resist rupturing or denting of their shell against a high pressure load better than hollow resin particles manufactured from conventional heat-expandable microspheres.

The hollow resin particles manufactured from the heat-expandable microspheres of the present invention resist rupturing or denting of their shell against a high pressure load, and are preferably used in applications including, for example, automotive body sealants, automotive undercoat materials, automotive damping paints and sealants for buildings.

The heat-expandable microspheres of the present invention are usable as a lightweight filler for putties, paints, inks, sealants, mortar, paper clays and porcelains and can be blended with a base material to be processed by injection molding, extrusion molding or press molding and manufactured into formed articles having good properties of sound insulation, heat insulation, heat shielding and sound absorbency.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the invention.

The invention claimed is:

1. Heat-expandable microspheres comprising a thermoplastic resin shell and a thermally-vaporizable blowing agent encapsulated therein;
   wherein the thermoplastic resin is a polymer of a polymerizable component containing a cross-linkable monomer (A) having at least two (meth)acryloyl groups per molecule and a reactive carbon-carbon double bond in addition to the (meth)acryloyl groups and having a molecular weight of 1000 to 50000, and
   the cross-linkable monomer (A) is a compound represented by the following formula (1):

$$R^1\text{—O—}R^2\text{—O—}R^3 \tag{1}$$

where $R^1$ and $R^3$ are (meth)acryloyl groups, and
$R^2$ has a structure containing reactive carbon-carbon double bond and a polymer chain, and a molecular weight of 830 to 49858, and
wherein the expansion initiation temperature (Ts) of the heat-expandable microsphere is 130 to 250° C.

2. The heat-expandable microspheres as claimed in claim 1, wherein the polymer chain has a diene as a structural unit.

3. The heat-expandable microspheres as claimed in claim 2, wherein the diene is butadiene and/or isoprene.

4. The heat-expandable microspheres as claimed in claim 1, wherein the polymerizable component contains an uncross-linkable monomer, and the uncross-linkable monomer contains a nitrile monomer.

5. Hollow resin particles manufactured by expanding the heat-expandable microspheres as claimed in claim 1.

6. Fine-particle-coated hollow resin particles comprising the hollow resin particles as claimed in claim 5 and fine particles coating the outer surface of the shell of the hollow resin particles.

7. A composition comprising a base component and the heat-expandable microspheres as claimed in claim 1.

8. A formed article manufactured by forming or molding the composition as claimed in claim 7.

9. A composition comprising a base component and the hollow resin particles as claimed in claim 5.

10. A formed article manufactured by forming or molding the composition as claimed in claim 9.

11. A composition comprising a base component and the fine-particle coated hollow resin particles as claimed in claim 6.

12. A formed article manufactured by forming or molding the composition as claimed in claim 11.

13. The heat-expandable microspheres as claimed in claim 1, wherein the expansion initiation temperature (Ts) of the heat-expandable microspheres is 145° C. to 250° C.

14. The heat-expandable microspheres as claimed in claim 1, wherein the cross-linkable monomer (A) has a molecular weight of 1500 to 50000, and $R^2$ has a molecular weight of 1330 to 49858.

15. The heat-expandable microspheres as claimed in claim 1, wherein the cross-linkable monomer (A) has a molecular weight of 10000 to 50000, and $R^2$ has a molecular weight of 9858 to 49858.

16. The heat-expandable microspheres as claimed in claim 4, wherein the nitrile monomer contains acrylonitrile, and an amount of the acrylonitrile in the uncross-linkable monomer is 60 wt % to 100 wt %.

17. The heat-expandable microsphere as claimed in claim 1, wherein the polymerizable component contains an uncross-linkable monomer, and the uncross-linkable monomer contain carboxyl-group-containing monomer.

18. The heat-expandable microsphere as claimed in claim 17, wherein an amount of the carboxyl-group-containing monomer in the uncross-linkable monomer is 5 to 70 wt %.

19. The heat-expandable microsphere as claimed in claim 1, wherein the polymerizable component contains an uncross-linkable monomer, and the uncross-linkable monomer contain nitrile monomer and carboxyl-group-containing monomer.

20. The heat-expandable microsphere as claimed in claim 19, wherein an amount of a total of the nitrile monomer and the carboxyl-group-containing monomer in the uncross-linkable monomer is 50 to 100 wt %.

* * * * *